US011394585B2

(12) United States Patent
Hayashi et al.

(10) Patent No.: US 11,394,585 B2
(45) Date of Patent: Jul. 19, 2022

(54) COMMUNICATION SYSTEM AND COMMUNICATION METHOD

(71) Applicant: Sony Semiconductor Solutions Corporation, Kanagawa (JP)

(72) Inventors: Hiroaki Hayashi, Kanagawa (JP); Hiroshi Shiroshita, Kanagawa (JP); Masatsugu Sugano, Kanagawa (JP); Yukio Shimomura, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 16/962,774

(22) PCT Filed: Jan. 11, 2019

(86) PCT No.: PCT/JP2019/000762
§ 371 (c)(1),
(2) Date: Jul. 16, 2020

(87) PCT Pub. No.: WO2019/146434
PCT Pub. Date: Aug. 1, 2019

(65) Prior Publication Data
US 2020/0396108 A1 Dec. 17, 2020

(30) Foreign Application Priority Data
Jan. 23, 2018 (JP) .............................. JP2018-008943

(51) Int. Cl.
*H04L 25/02* (2006.01)
*H04B 3/32* (2006.01)
*H04L 7/00* (2006.01)
(52) U.S. Cl.
CPC .......... *H04L 25/0204* (2013.01); *H04B 3/32* (2013.01); *H04L 7/0008* (2013.01)

(58) Field of Classification Search
CPC ... G06F 13/42; H04L 25/0204; H04L 7/0008; H04B 3/32
See application file for complete search history.

(56) References Cited

U.S. PATENT DOCUMENTS 9,094,246 B1 7/2015 Chi et al.
2009/0267678 A1 10/2009 Bilger et al.
(Continued)

FOREIGN PATENT DOCUMENTS

JP 2008-042376 A 2/2008
JP 2017-195500 A 10/2017
(Continued)

OTHER PUBLICATIONS

Extended European Search report dated Mar. 12, 2021 for corresponding European Application No. 19744236.1.
(Continued)

*Primary Examiner* — Sung S Ahn
(74) *Attorney, Agent, or Firm* — Michael Best & Friedrich LLP

(57) ABSTRACT

A communication system according to an embodiment of the present disclosure is a communication system that transmits data from a plurality of transmission devices to one reception device via a pair of signal lines. In the communication system, each of the transmission devices includes: a mode controller that controls a transmission mode; a transmission data generator that generates the data in accordance with the transmission mode; and a data transmitter that transmits the generated data to the reception device. In a case where the transmission mode of a first transmission device is an HS mode, the mode controller of a second transmission device turns the transmission mode of the second transmission device to a termination mode in which an output terminal of the second transmission device is terminated.

16 Claims, 18 Drawing Sheets

(56) References Cited

U.S. PATENT DOCUMENTS

2013/0346656 A1    12/2013  Harriman et al.
2017/0017587 A1*    1/2017  West ...................... G11C 7/222
2018/0074990 A1*    3/2018  Matsumoto ............. G06F 13/36

FOREIGN PATENT DOCUMENTS

WO         2016/163252 A1    10/2016
WO         WO2016163252    *  10/2016
WO         2017/169756 A1    10/2017

OTHER PUBLICATIONS

Gerrit Den Besten et al., "D-PHY Tutorial" Jan. 1, 2005 (Jan. 1, 2005), XP055058187,Retrieved from the Internet: URL:http://www.mipi.org, [retrieved on Mar. 28, 2013] p. 13—p. 15—p. 24.

* cited by examiner

[FIG. 1]
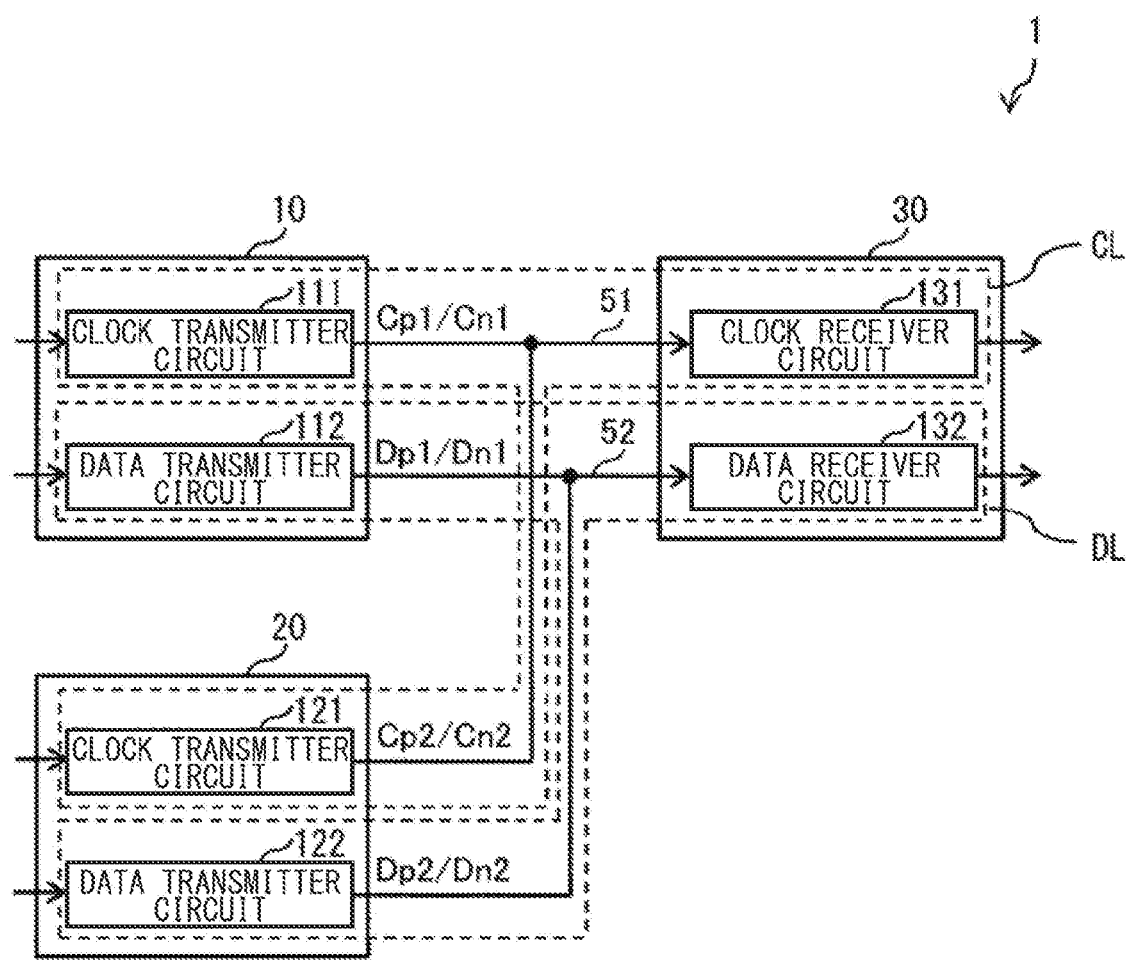

[FIG. 2]
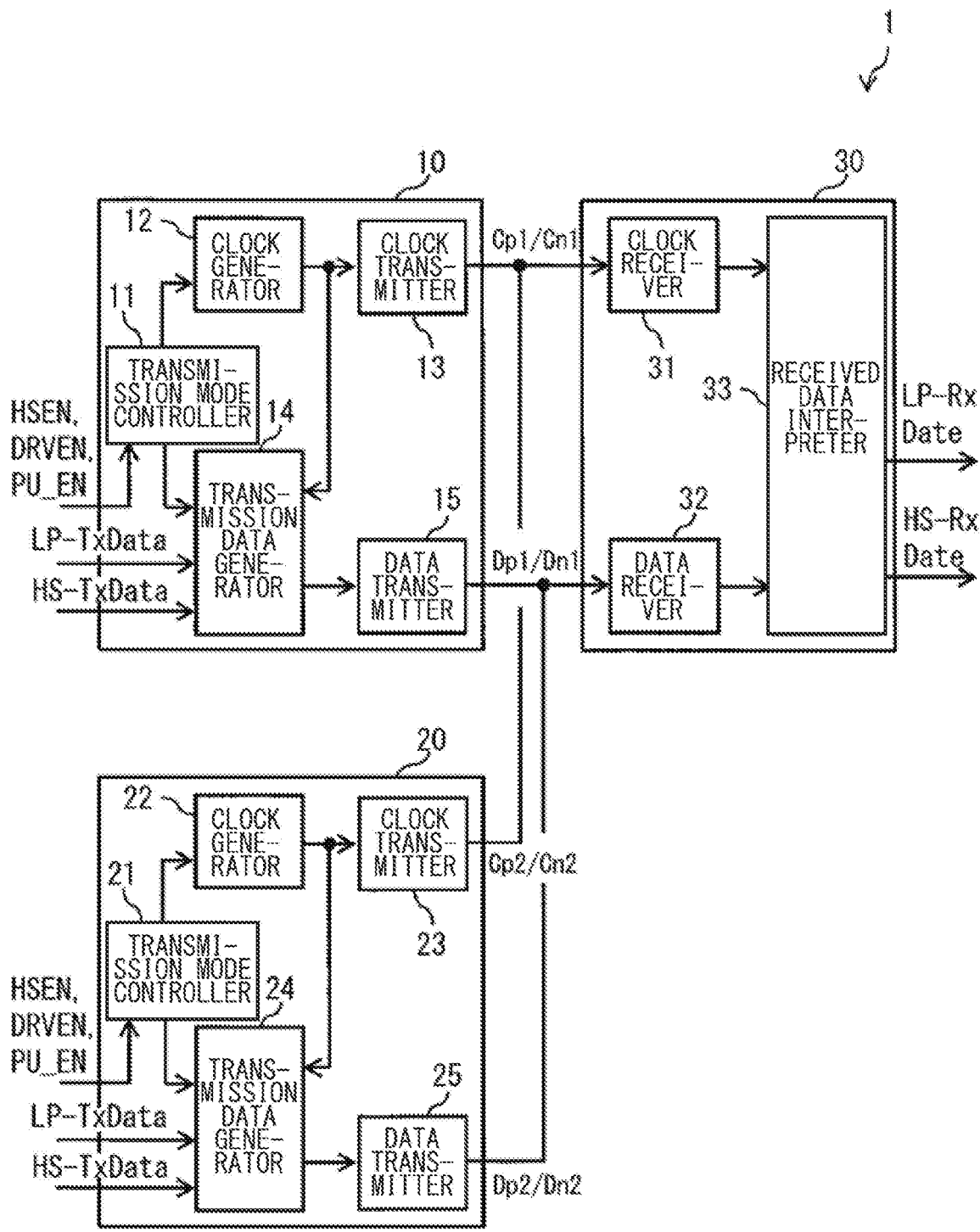

[ FIG. 3 ]

| HSEN | 1 (HS MODE Enable) | 0 (Disable) |
|---|---|---|
| DRVEN | 1 (HS MODE / LP MODE Enable) | 0 (Disable) |
| PU_EN | 1 (PU MODE Enable) | 0 (Disable) |

[ FIG. 4 ]

| HSEN | DRVEN | PU_EN | MODE |
|---|---|---|---|
| 1 | 1 | 0 | HS MODE |
| 0 | 1 | 0 | LP MODE |
| 0 | 1 | 1 | LP MODE+PullUp MODE |
| 0 | 0 | 1 | PullUp MODE |
| 0 | 0 | 0 | HiZ MODE |

[FIG. 5]
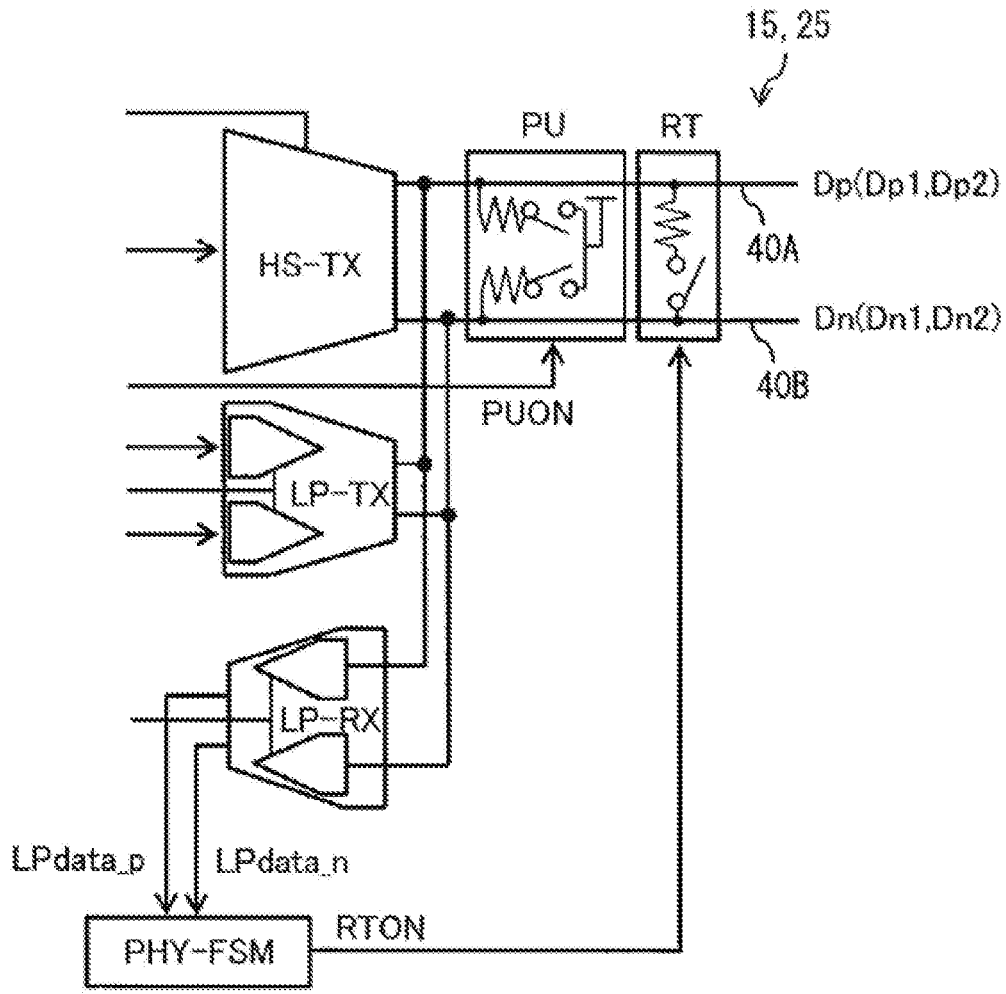
[FIG. 6]
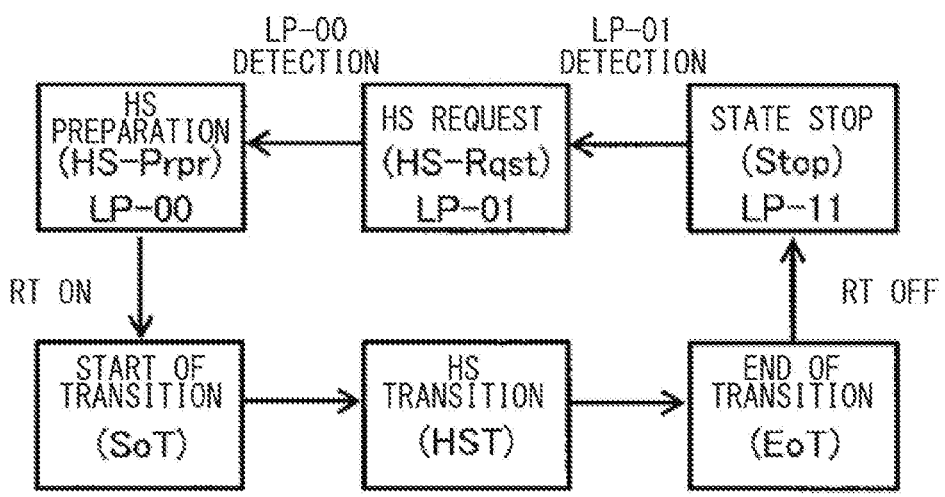

[ FIG. 7 ]
CIRCUIT OF PHY-FSM
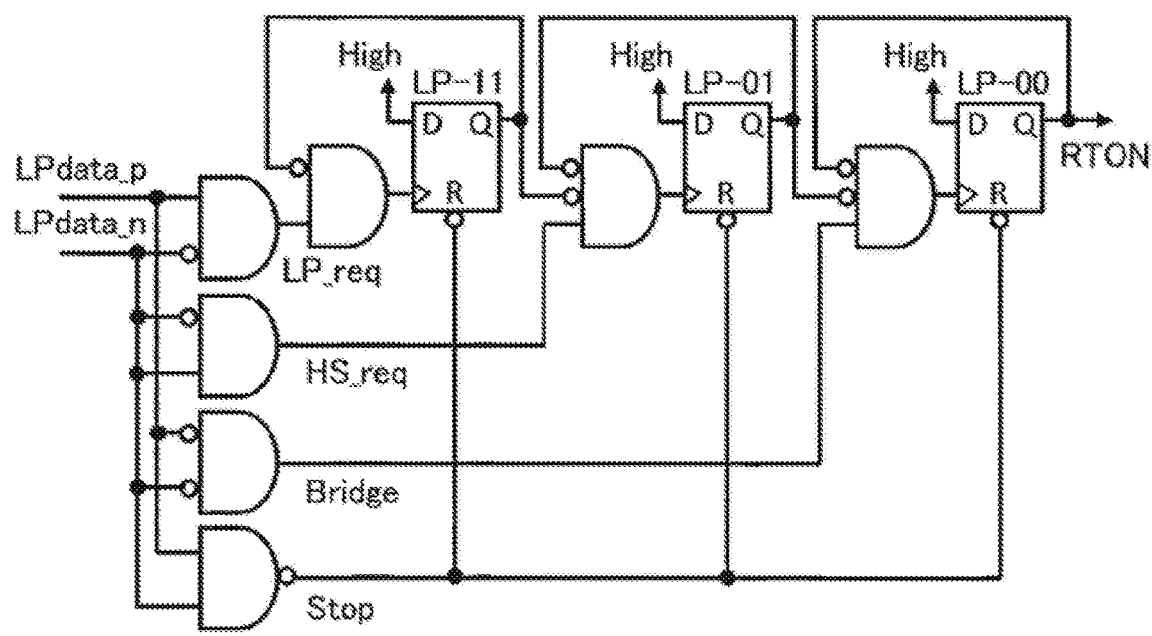

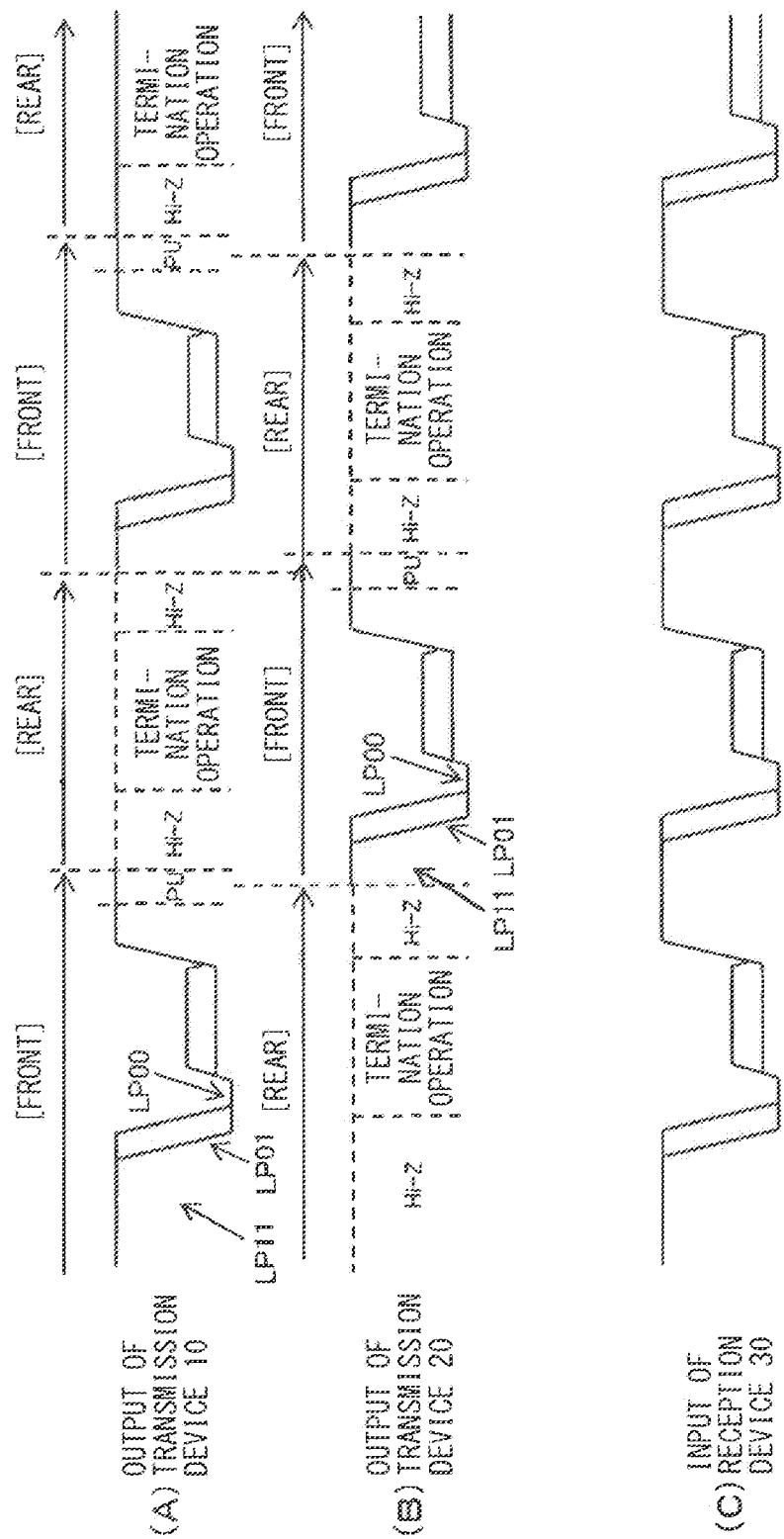

[ FIG. 9 ]
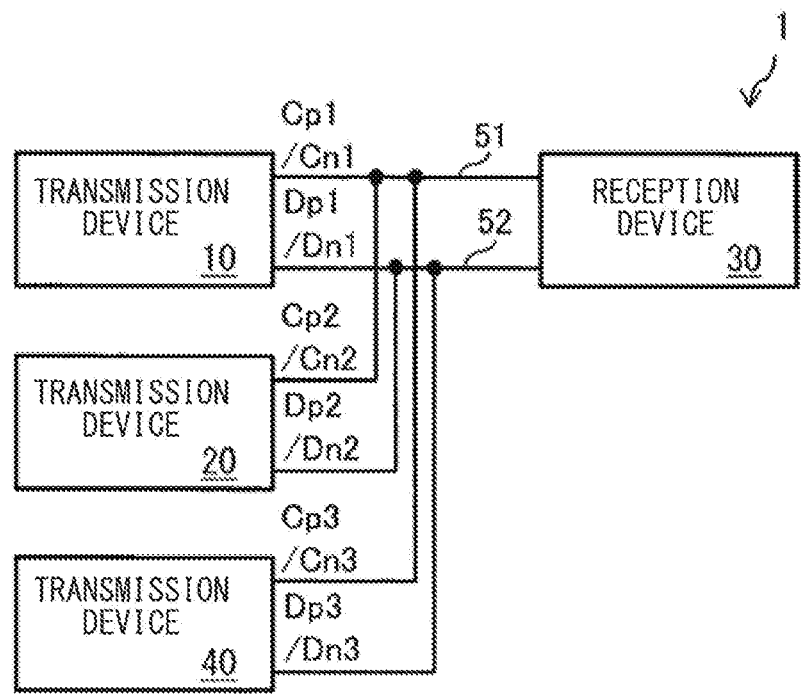
[ FIG. 10 ]
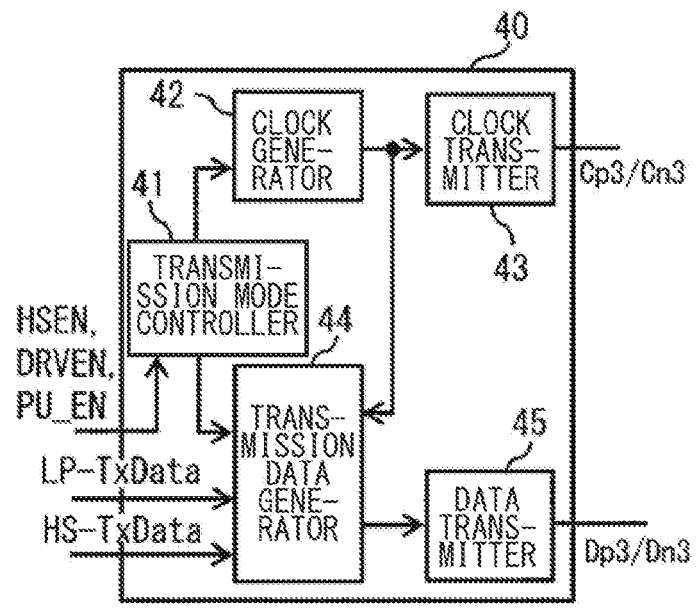

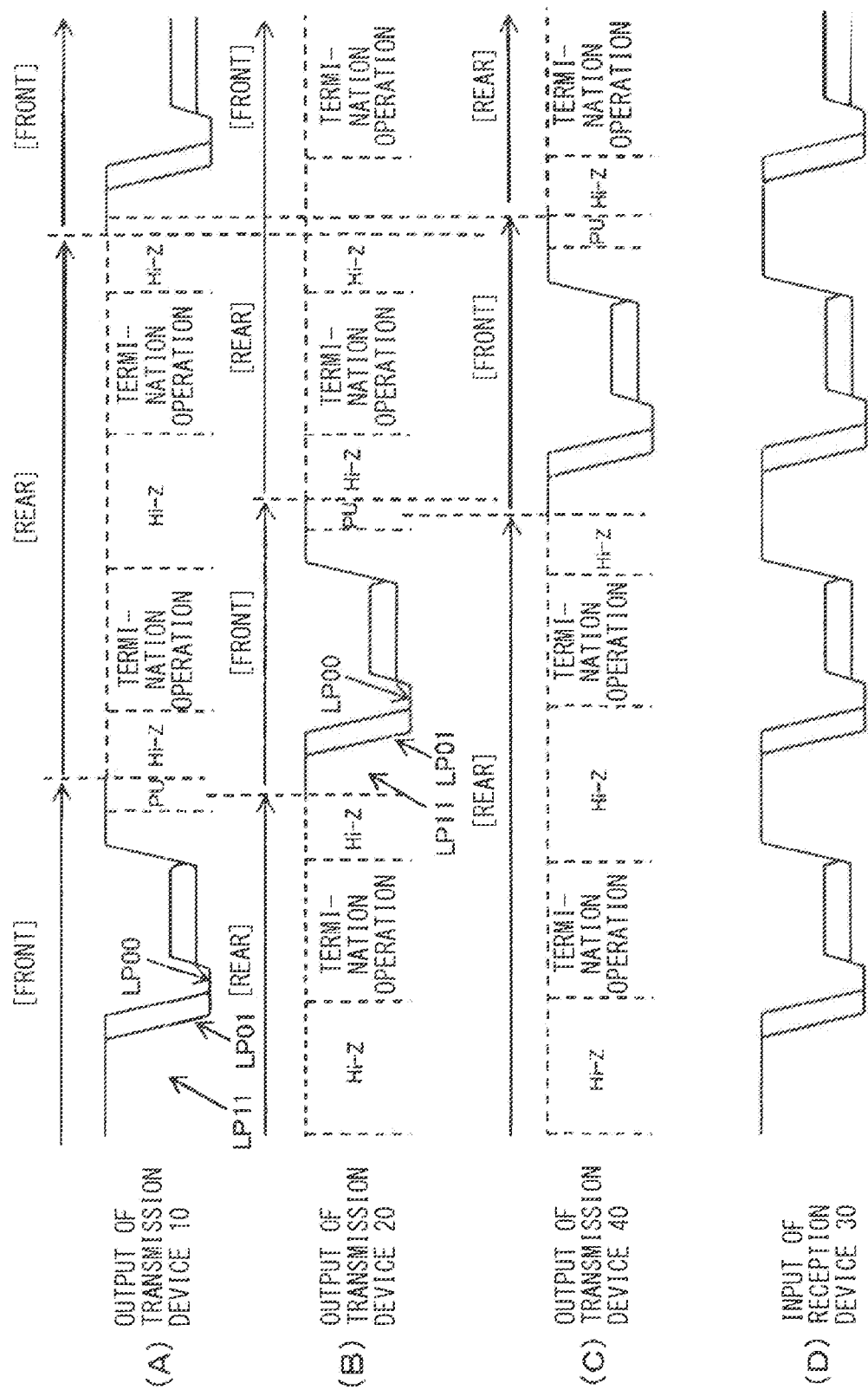

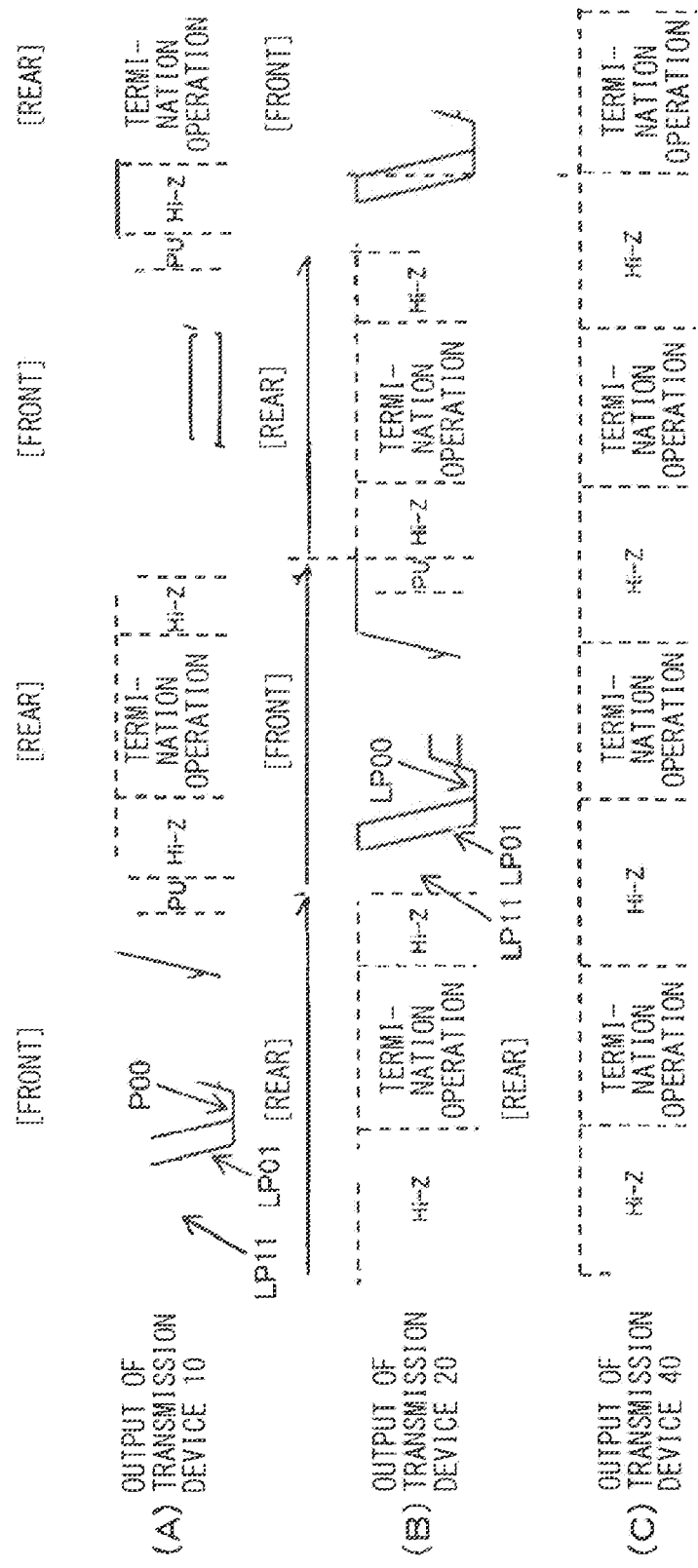

[ FIG. 13 ]
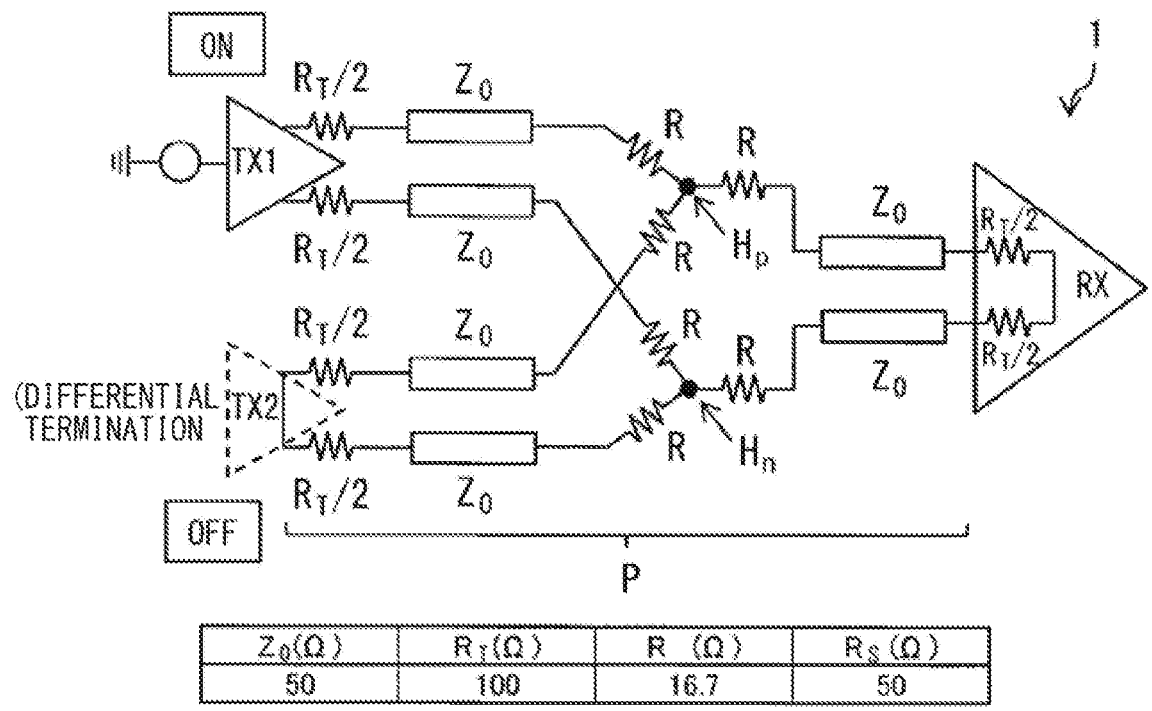
R = ((NUMBER OF BRANCHES − 1) × $Z_0$ − $R_T$/2) / NUMBER OF BRANCHES
[ FIG. 14 ]
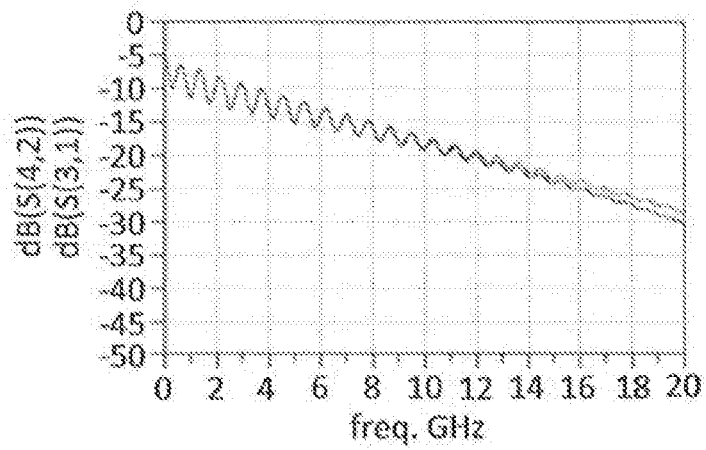

[ FIG. 15 ]
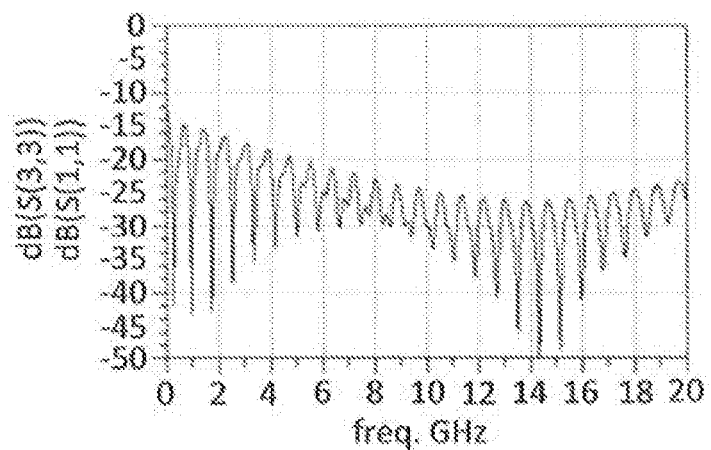
[ FIG. 16 ]
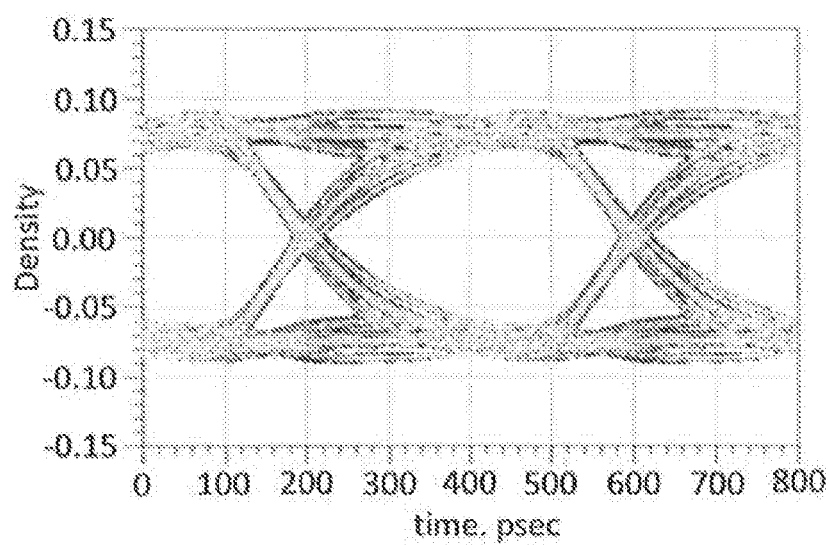

[FIG. 17]
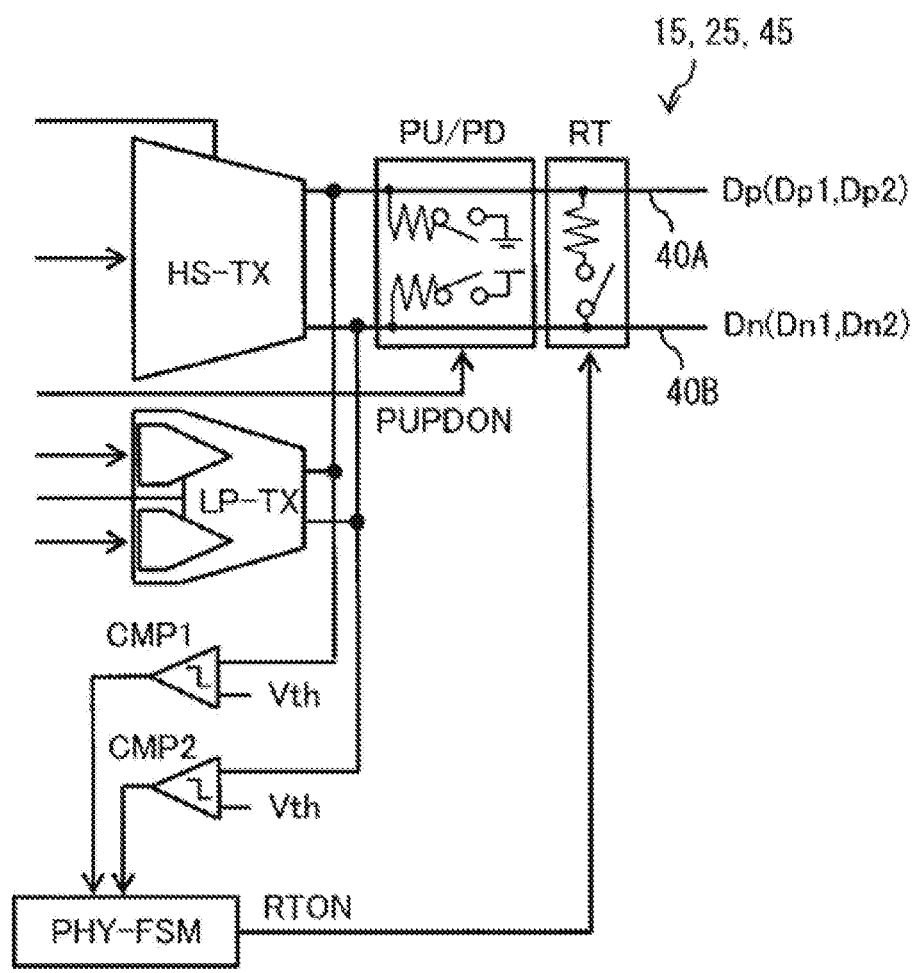

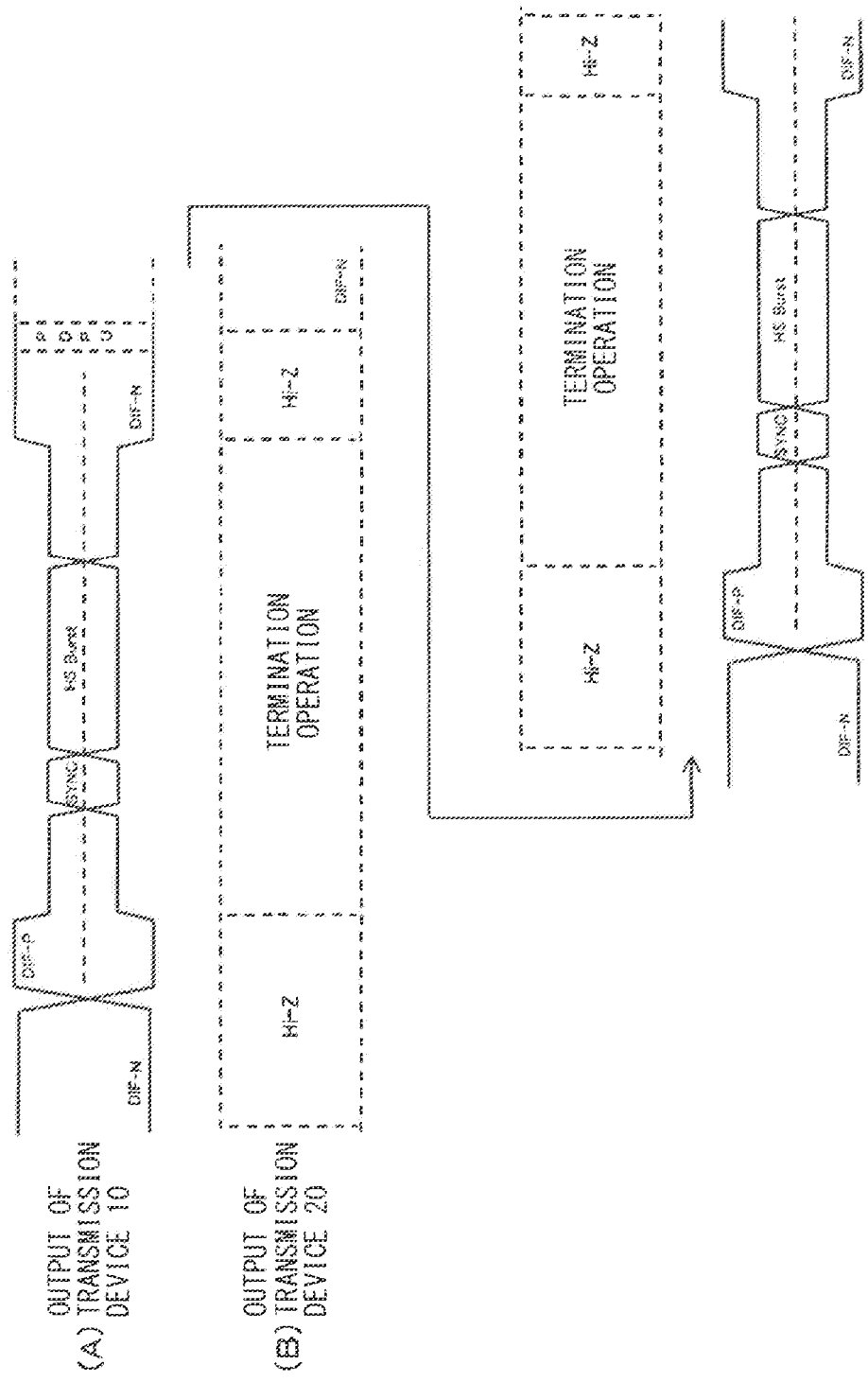
[FIG. 18]

[ FIG. 19 ]
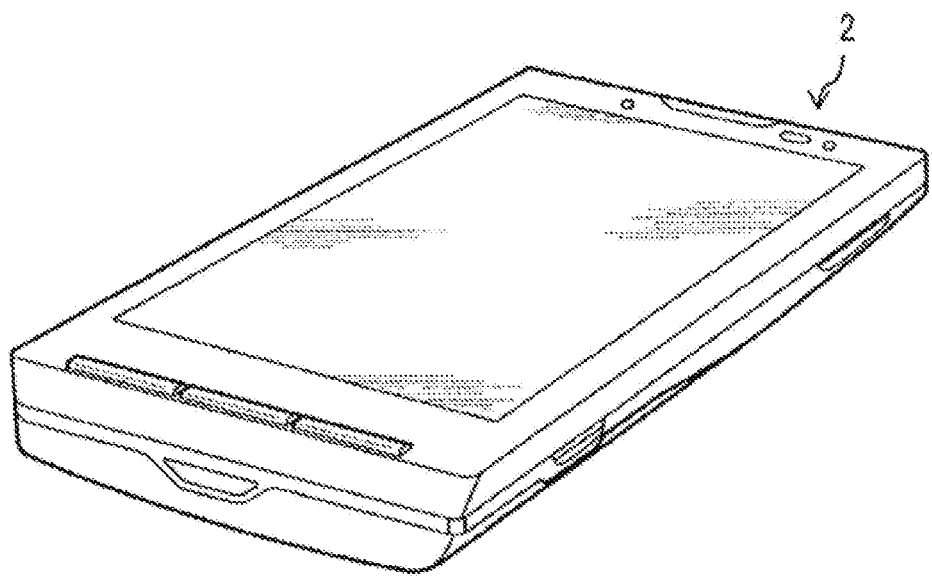

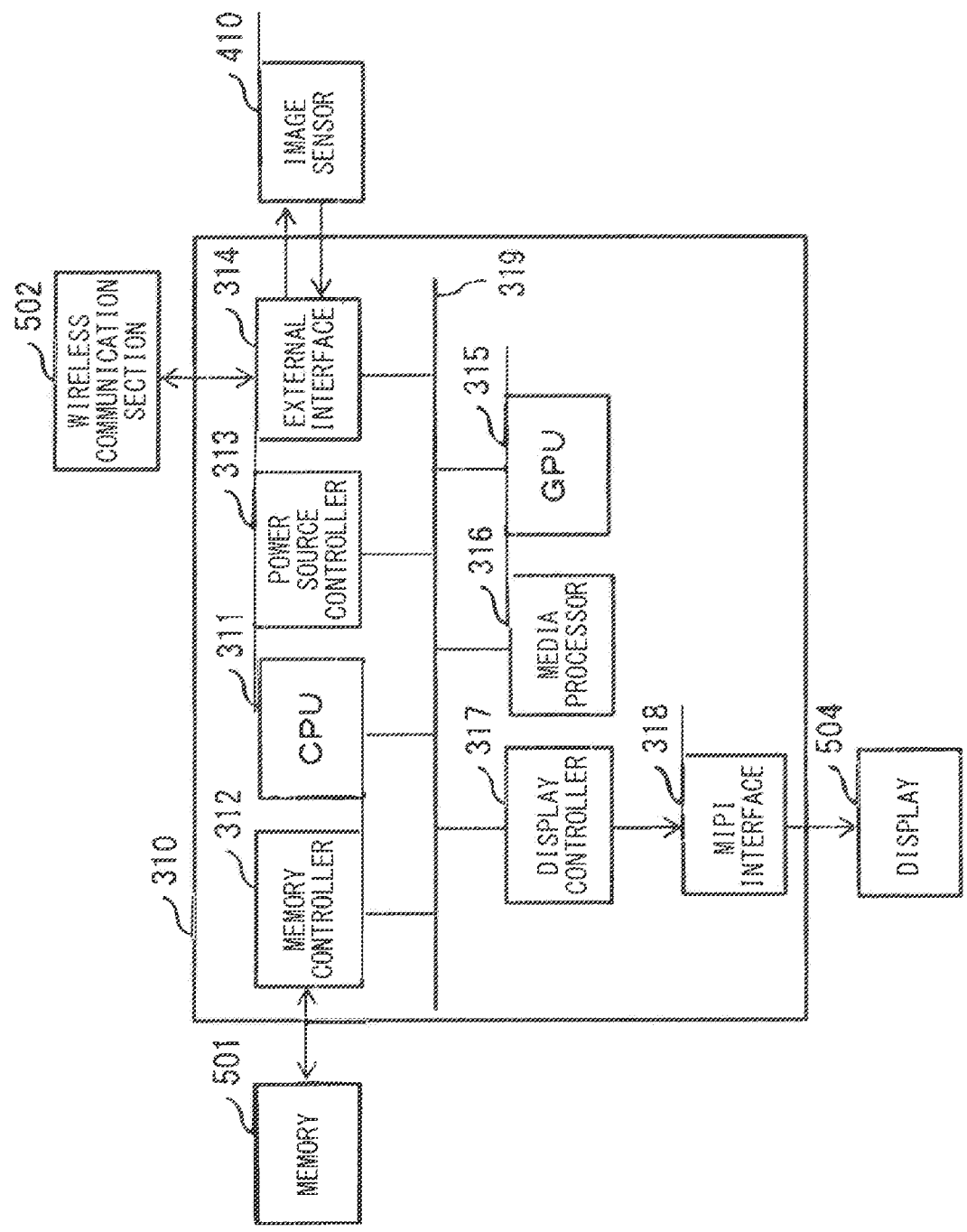
[FIG. 20]

[FIG. 21]
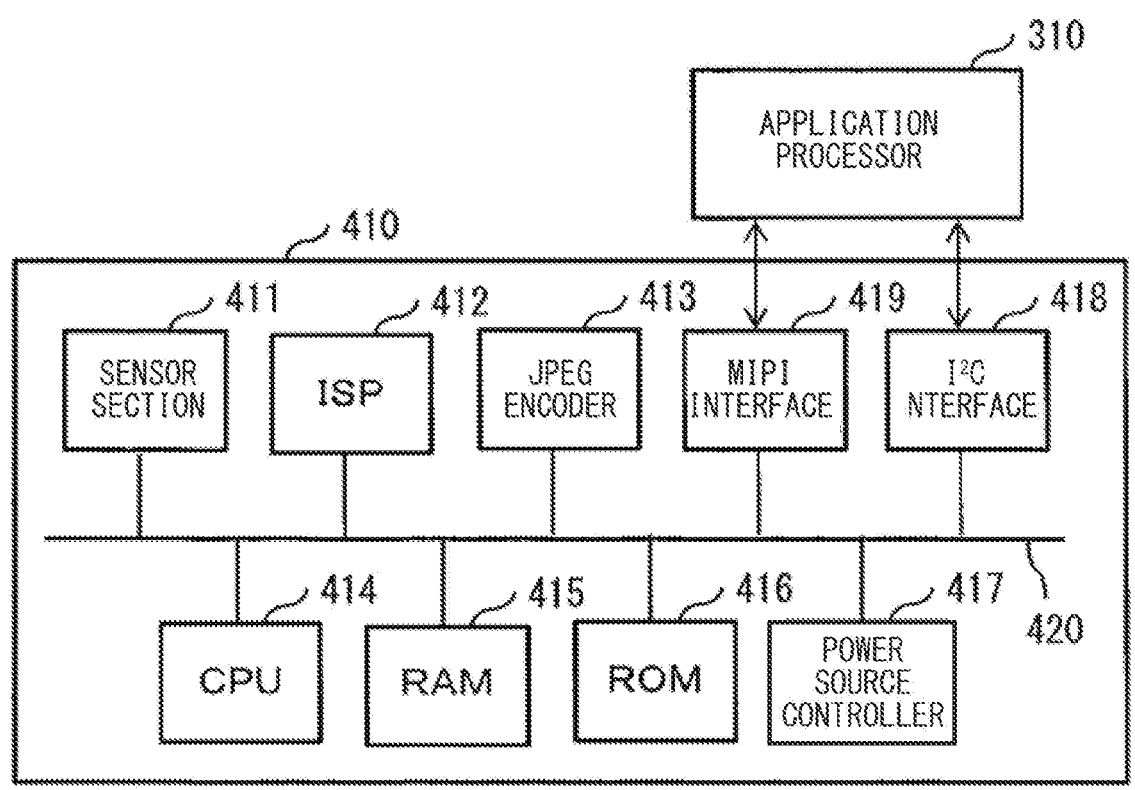

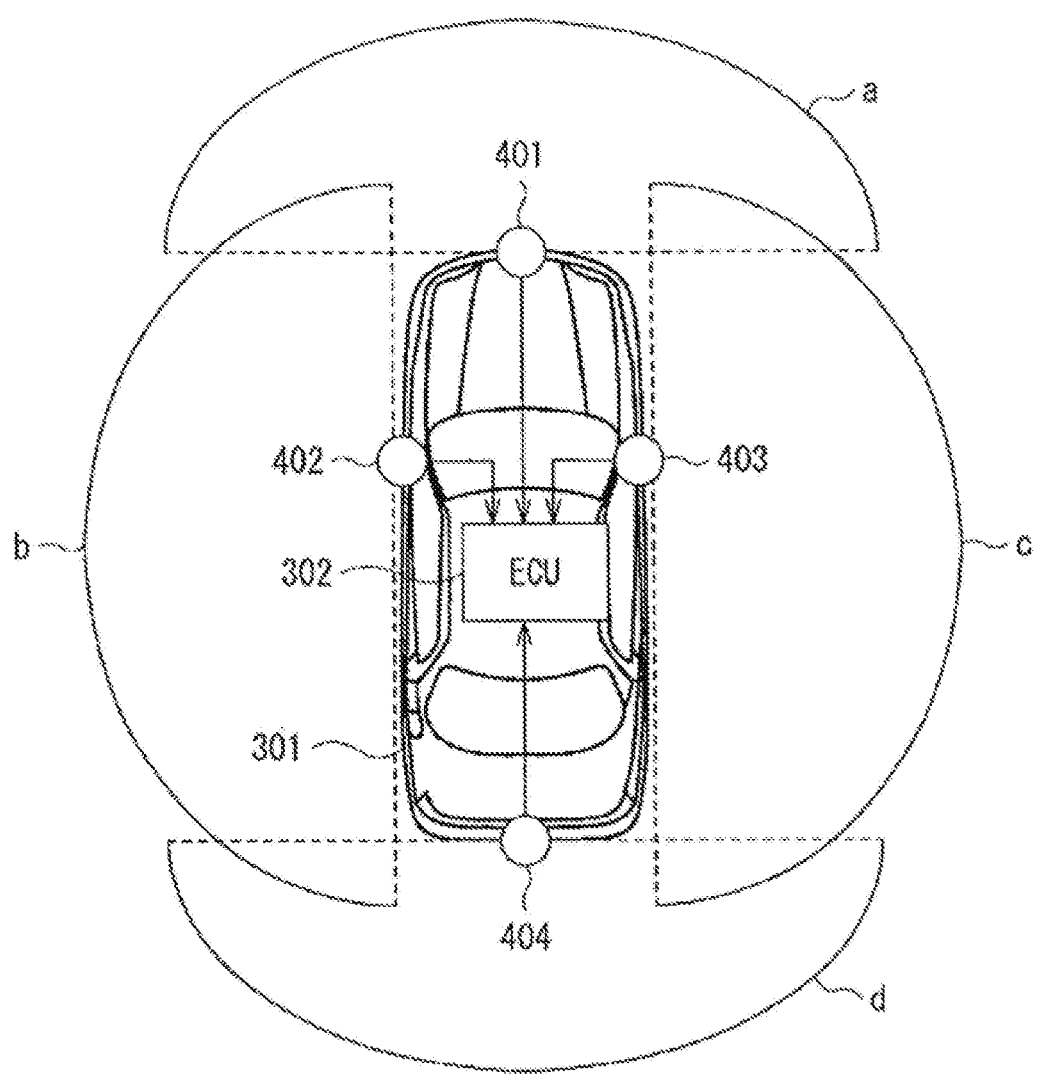
[FIG. 22]

[ FIG. 23 ]
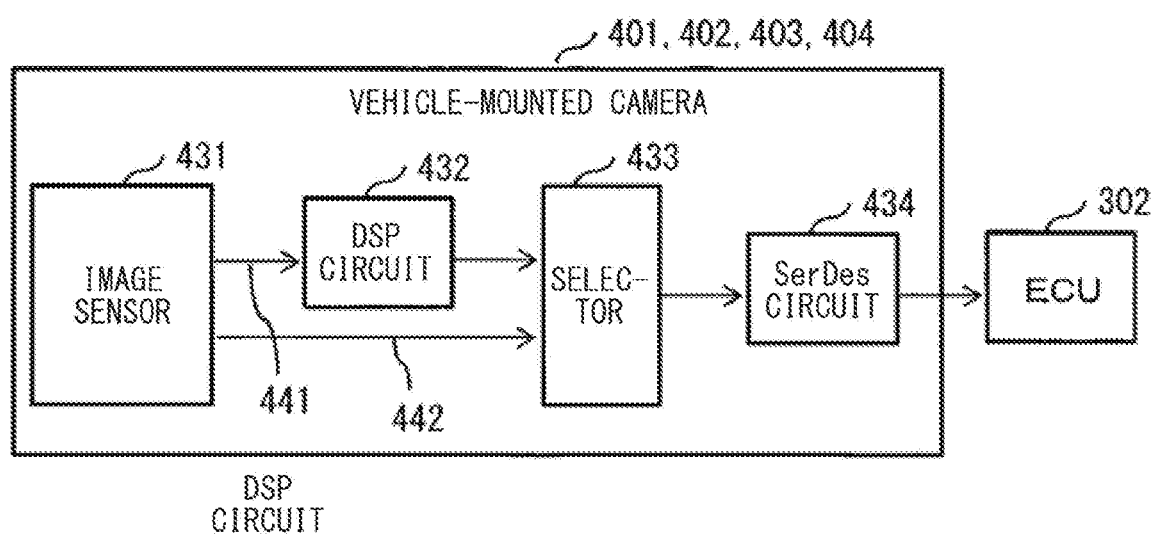

COMMUNICATION SYSTEM AND COMMUNICATION METHOD

TECHNICAL FIELD

The present disclosure relates to a communication system and a communication method that are applied to transmission of a data signal.

BACKGROUND ART

In recent years, drones, wearable devices, automobiles, and the like equipped with a plurality of cameras are rapidly increasing. High-speed interface specifications such as C-PHY specification and D-PHY specification that have been developed by the MIPI (Mobile Industry Processor Interface) alliance are applied in a case where image data from a plurality of cameras is transmitted to an application processor and the like. PTL 1 proposes a technology for signal transmission in the D-PHY specification.

CITATION LIST

Patent Literature

PTL 1: Japanese Unexamined Patent Application Publication No. 2017-195500

SUMMARY OF THE INVENTION

Incidentally, in the MIPI, data transmission is point-to-point transmission; therefore, there are many issues to be solved to support a plurality of cameras, such as limitations on the number of pins on an application processor side, an increase in size of a transmission path, and product design. Multipoint bus transmission shows promise for support of a plurality of cameras. However, in existing multipoint bus transmission, waveform quality is greatly deteriorated by an influence of reflection and the like, which causes an issue that the existing multipoint bus transmission is not suitable for high-speed transmission. It is therefore desirable to provide a communication system and a communication method that make it possible to achieve multipoint bus transmission suitable for high-speed transmission.

A communication system according to an embodiment of the present disclosure is a communication system that transmits data from a plurality of transmission devices to one reception device via a pair of signal lines. In the communication system, each of the transmission devices includes: a mode controller that controls a transmission mode; a transmission data generator that generates the data in accordance with the transmission mode controlled by the mode controller; and a data transmitter that transmits the data generated by the transmission data generator to the reception device. In a case where the transmission mode of a first transmission device of the plurality of the transmission devices is an HS (High Speed) mode, the mode controller of a second transmission device of the plurality of the transmission devices turns the transmission mode of the second transmission device to a termination mode in which an output terminal of the second transmission device is terminated.

A communication method according to an embodiment of the present disclosure is a communication method of transmitting data from a plurality of transmission devices to one reception device via a pair of signal lines, and includes the following step. In a case where a transmission mode of a first transmission device of the plurality of the transmission devices is an HS mode, a transmission mode of a second transmission device of the plurality of transmission devices is turned to a termination mode in which an output terminal of the second transmission device is terminated.

In the communication system and the communication method according to the embodiments of the present disclosure, in the case where the transmission mode of the first transmission device of the plurality of transmission devices is the HS mode, the transmission mode of the second transmission mode of the plurality of transmission devices is turned to the termination mode in which the output terminal of the second device is terminated. Accordingly, total reflection in the second transmission device is suppressed in the case where the transmission mode of the first transmission device is the HS mode. In addition, it is possible to perform transmission while performing switching between the HS mode and the LP mode.

BRIEF DESCRIPTION OF DRAWING

FIG. 1 is a diagram illustrating an overview of a communication system according to a first embodiment of the present disclosure.

FIG. 2 is a diagram illustrating an example of the communication system in FIG. 1.

FIG. 3 is a diagram illustrating an example of three control signals to be used for mode control in the communication system in FIG. 2.

FIG. 4 is a diagram illustrating an example of transmission modes corresponding to combinations of the three control signals in FIG. 3.

FIG. 5 is a diagram illustrating an example of a configuration of a data transmitter in the communication system in FIG. 2.

FIG. 6 is a diagram illustrating an example of a function of a PHY-SFM in FIG. 5.

FIG. 7 is a diagram illustrating an example of a circuit of the PHY-SFM in FIG. 5.

FIG. 8 is a diagram illustrating an example of waveforms of the communication system in FIG. 1.

FIG. 9 is a diagram illustrating a modification example of the configuration of the communication system in FIG. 1.

FIG. 10 is a diagram illustrating an example of a configuration of a transmission device in the communication system in FIG. 9.

FIG. 11 is a diagram illustrating an example of waveforms of the communication system in FIG. 9.

FIG. 12 is a diagram illustrating a modification example of waveforms of the communication system in FIG. 9.

FIG. 13 is a diagram illustrating an overview of the communication system in FIG. 1.

FIG. 14 is a diagram illustrating an example of pass characteristics in the communication system in FIG. 13.

FIG. 15 is a diagram illustrating an example of reflection characteristics in the communication system in FIG. 13.

FIG. 16 is a diagram illustrating an example of an eye diagram in the communication system in FIG. 13.

FIG. 17 is a diagram illustrating a modification example of a transmission data generator in the communication system in FIGS. 1 and 9.

FIG. 18 is a diagram illustrating an example of waveforms of a communication system including the transmission data generator in FIG. 17.

FIG. 19 is a diagram illustrating an example of an appearance configuration of a smartphone to which the communication system described above is applied.

FIG. 20 is a diagram illustrating a configuration example of an application processor to which the communication system described above is applied.

FIG. 21 is a diagram illustrating a configuration example of an image sensor to which the communication system described above is applied.

FIG. 22 is a diagram illustrating an installation example of a vehicle-mounted camera to which the communication system described above is applied.

FIG. 23 is a diagram illustrating a configuration example in which the communication system described above is applied to the vehicle-mounted camera.

MODES FOR CARRYING OUT THE INVENTION

Hereinafter, some embodiments of the present disclosure are described in detail with reference to the drawings. It should be noted that the description is given in the following order.
1. Embodiment
2. Modification Examples
3. Application Examples

1. Embodiment

[Configuration]

Description is given of a communication system 1 according to an embodiment of the present disclosure. FIG. 1 illustrates an overview of the communication system 1. The communication system 1 is applied to transmission of a data signal and a clock signal, and includes transmission devices 10 and 20 and a reception device 30. The communication system 1 includes a clock lane CL a data lane DL over the transmission devices 10 and 20 and the reception device 30. The clock lane CL transmits the clock signal, and the data lane DL transmits the data signal such as image data, for example. That is, the communication system 1 is configured to perform multipoint bus transmission.

The transmission devices 10 and 20 each include a digital transmitter circuit and an analog transmitter circuit. The reception device 30 includes a digital receiver circuit and an analog receiver circuit. For example, a 16-bit or 8-bit parallel signal is transmitted between the digital transmitter circuit and the analog transmitter circuit. In addition, for example, a 16-bit or 8-bit parallel signal is transmitted between the digital receiver circuit and the analog receiver circuit. In the clock lane CL, the analog transmitter circuit and the analog receiver circuit are coupled to each other by a clock signal line 51 that transmits a differential clock signal. In the data lane DL, the analog transmitter circuit and the analog receiver circuit are coupled to each other by a data signal line 52 that transmits a differential data signal. The clock signal line 51 includes a pair of a positive signal line Cp and a negative signal line Cn that transmit a differential signal. The data signal line 52 includes a pair of a positive signal line Dp and a negative signal line Dn that transmit a differential signal. For example, a 1-bit serial signal is transmitted to each of the clock signal line 51 and the data signal line 52.

The transmission device 10 includes a clock transmitter circuit 111 and a data transmitter circuit 112. The transmission device 20 includes a clock transmitter circuit 121 and a data transmitter circuit 122. The reception device 30 includes a clock receiver circuit 131 and a data receiver circuit 132. In the clock lane CL, the clock transmitter circuits 111 and 121 and the clock receiver circuit 131 are coupled to each other by the clock signal line 51 described above. In the data lane DL, the data transmitter circuits 112 and 122 and the data receiver circuit 132 are coupled to each other by the data signal line 52 described above. Each of the clock transmitter circuits 111 and 121 is a differential signal transmitter circuit that generates a differential clock signal as the clock signal and outputs the thus-generated differential clock signal to the clock signal line 51. Each of the data transmitter circuits 112 and 122 is a differential signal transmitter circuit that generates a differential data signal as the data signal and outputs the thus-generated differential data signal to the data signal line 52. The clock receiver circuit 131 is a differential signal receiver circuit that receives the differential clock signal as the clock signal via the clock signal line 51 and performs predetermined processing on the received differential clock signal. The data receiver circuit 132 is a differential signal receiver circuit that receives the differential data signal as the data signal via the data signal line 52 and performs predetermined processing on the received differential data signal. It should be noted that each of the clock transmission devices 111 and 121 and the data transmission devices 112 and 122 may be a ternary signal transmitter circuit that outputs a ternary level signal. In addition, each of the clock receiver circuit 131 and the data receiver circuit 132 may be a ternary signal receiver circuit.

FIG. 2 illustrates an example of a configuration of the communication system 1. The communication system 1 illustrated in FIG. 2 represents the communication system 1 illustrated in FIG. 1 with functional blocks.

The transmission device 10 includes, in the clock lane CL, a transmission mode controller 11, a clock generator 12, and a clock transmitter 13. The transmission device 10 includes, in the data lane DL, a transmission data generator 14 and a data transmitter 15. The transmission mode controller 11 decides a transmission mode in accordance with an instruction from an upper layer (e.g., three control signals HSEN, DRVEN, and PU_EN as illustrated in FIGS. 2 and 3).

Here, the control signal HSEN is a signal for setting Enable and Disable of an HS mode. The control signal DRVEN is a signal for setting Enable and Disable of the HS mode or an LP mode. The control signal PU_EN is a signal for setting Enable and Disable of a PU (PullUp) mode. The transmission mode controller 11 sets various modes in accordance with a combination of the three control signals HSEN, DRVEN, and PU_EN), for example, as illustrated in FIG. 4.

For example, in a case of (HSEN, DRVEN, PU_EN)=(1, 1, 0), the transmission mode controller 11 sets the HS mode. In addition, for example, in a case of (HSEN, DRVEN, PU_EN)=(0, 1, 0), the transmission mode controller 11 sets the LP mode. In addition, for example, in a case of (HSEN, DRVEN, PU_EN)=(0, 1, 1), the transmission mode controller 11 further sets the PullUp mode in the LP mode (hereinafter referred to as "LP mode+PullUp mode"). In addition, for example, in a case of (HSEN, DRVEN, PU_EN)=(0, 0, 1), the transmission mode controller 11 sets the PullUp mode. In addition, for example, in a case of (HSEN, DRVEN, PU_EN)=(0, 0, 0), the transmission mode controller 11 sets a high impedance (HiZ) mode.

The PullUp mode indicates a mode in which a voltage of a pair of output terminals 40A and 40B is pulled up to a predetermined voltage value. The LP mode+PullUp mode indicates a mode in which the voltage of the pair of output terminals 40A and 40B is pulled up to a predetermined voltage value in addition to setting the LP mode. The HiZ mode indicates that the pair of output terminals 40A and 40B are turned to a floating state.

The transmission mode controller 11 further performs control corresponding to a decided transmission mode, on the clock generator 12 and the transmission data generator 14. The clock generator 12 generates a clock signal with a clock frequency corresponding to a transmission mode in accordance with an instruction of the transmission mode controller 11. The clock generator 12 outputs the generated clock signal to the clock transmitter 13 and the transmission data generator 14. The clock transmitter 13 outputs the clock signal generated by the clock generator 12 to the clock signal line 51. That is, the clock transmitter 13 outputs the clock signal generated by the clock generator 12 to a clock receiver 31 via the clock signal line 51.

The transmission data generator 14 performs, in accordance with an instruction of the transmission mode controller 11, various kinds of processing such as communication protocol control, decoding of data inputted from an upper layer, insertion of a control command, and parallel-serial conversion, on an inputted data signal (e.g., high-speed transmission data HS-TxData or low-speed transmission data LP-TxData), thereby generating a data signal. The transmission data generator 14 outputs the generated data signal to the data transmitter 15. The transmission data generator 14 switches various kinds of processing described above in accordance with an instruction of the transmission mode controller 11. The data transmitter 15 outputs the data signal generated by the transmission data generator 14 to a data signal line. That is, the data transmitter 15 outputs the data signal generated by the transmission data generator 14 to a data receiver 32 via the data signal line.

The transmission device 20 includes, in the clock lane CL, a transmission mode controller 21, a clock generator 22, and a clock transmitter 23. The transmission device 20 includes, in the data lane DL, a transmission data generator 24 and a data transmitter 25. The transmission mode controller 21 decides a transmission mode in accordance with an instruction from an upper layer (e.g., three control signals HSEN, DRVEN, and PU_EN). The transmission mode controller 21 further performs control corresponding to a decided transmission mode, on the clock generator 22 and the transmission data generator 24. The clock generator 22 generates a clock signal with a clock frequency corresponding to a transmission mode in accordance with an instruction of the transmission mode controller 21. The clock generator 22 outputs the generated clock signal to the clock transmitter 23 and the transmission data generator 24. The clock transmitter 23 outputs the clock signal generated by the clock generator 22 to the clock signal line 51. That is, the clock transmitter 23 outputs the clock signal generated by the clock generator 22 to the clock receiver 31 via the clock signal line 51.

The transmission data generator 24 performs, in accordance with an instruction of the transmission mode controller 21, various kinds of processing such as communication protocol control, decoding of data inputted from an upper layer, insertion of a control command, and parallel-serial conversion, on an inputted data signal (e.g., high-speed transmission data HS-TxData or low-speed transmission data LP-TxData), thereby generating a data signal. The transmission data generator 24 outputs the generated data signal to the data transmitter 25. The transmission data generator 24 switches various kinds of processing described above in accordance with an instruction of the transmission mode controller 21. The data transmitter 25 outputs the data signal generated by the transmission data generator 24 to a data signal line. That is, the data transmitter 25 outputs the data signal generated by the transmission data generator 24 to the data receiver 32 via the data signal line.

The reception device 30 includes the clock receiver 31 in the clock lane CL. The reception device 30 includes, in the data lane DL, the data receiver 32 and a received data interpreter 33. The clock receiver 31 receives the clock signal outputted from the clock transmitter 13 or the clock transmitter 23 via the clock signal line 51. The clock receiver 31 outputs the received clock signal to the received data interpreter 33. The data receiver 32 receives the data signal outputted from the data transmitter 15 or the data transmitter 25 via the data signal line 52. The data receiver 32 outputs the received data signal to the received data interpreter 33. The received data interpreter 33 performs, on the basis of the inputted clock signal, various kinds of processing such as serial-parallel conversion, detection of a control command, decoding of signal data, and communication protocol control, on the inputted data signal, thereby generating a data signal to be provided to a subsequent stage. The received data interpreter 33 switches various kinds of processing described above in accordance with the inputted clock signal, for example. The received data interpreter 33 outputs the generated data signal (e.g., high-speed reception data HS-RxData or low-speed reception data LP-RxData) to a circuit of a subsequent stage.

[Data Transmitter]

FIG. 5 illustrates an example of the data transmitters 15 and 25 in the communication system 1. Each of the data transmitters 15 and 25 includes a driver HS-TX for signal transmission in the HS mode, a driver LP-TX for signal transmission in the LP mode, and a driver LP-RX for signal reception in the LP mode. Each of the data transmitters 15 and 25 further includes a terminator resistor RT and a pull-up resistor PU. The terminator resistor RT is configured to turn on and off termination of the pair of output terminals 40A and 40B coupled to a pair of data signal lines 52, and the pull-up resistor PU is configured to pull up the pair of output terminals 40A and 40B coupled to the pair of data signal lines 52. The pull-up resistor PU controls on and off of a pull-up resistor on the basis of a control signal PUON for controlling pull-up. Each of the data transmitters 15 and 25 includes a terminator controller PHY-FSM.

The driver HS-TX outputs the low-speed transmission data LP-TxData inputted from the transmission data generators 14 and 24 to the pair of data signal lines 52 via the pair of output terminals 40A and 40B on the basis of control signals from the transmission data generators 14 and 24. The driver HS-TX outputs the low-speed transmission data LP-TxData inputted from the transmission data generators 14 and 24 to the pair of data signal lines 52 via the pair of output terminals 40A and 40B on the basis of control signals from the transmission data generators 14 and 24. The termination controller PHY-FSM detects a transmission mode in any other transmission device on the basis of the voltage of the pair of output terminals 40A and 40B. Examples of kinds of transmission modes to be detected by the termination controller PHY-FSM include LP-11 of the LP mode, LP-01 of the LP mode, LP-00 of the LP mode, or the like.

The termination controller PHY-FSM further controls on and off of the terminator resistor RT on the basis of the detected transmission mode (a result of detection). FIG. 6 illustrates an example of a function of the termination controller PHY-FSM. FIG. 7 illustrates an example of a circuit of the termination controller PHY-FSM. Suppose that the termination controller PHY-FSM detects that any other transmission device is in LP-11 of the LP mode on the basis of LPdata_p and LPdata_n, for example. At this time, in both the transmission devices 10 and 20, state variation is stopped. Suppose that, for example, the termination controller PHY-FSM detects that the other transmission device is turned to LP-01 of the LP mode on the basis of LPdata_p and LPdata_n after detecting that the other transmission device is in LP-11 of the LP mode. At this time, the other transmission device has started a transition of a state from LP-11 of the LP mode to the HS mode. Suppose that, for example, the termination controller PHY-FSM detects that the other transmission device is turned to LP-00 of the LP mode on the basis of LPdata_p and LPdata_n after detecting that the other transmission device is turned to LP-01 of the LP mode. At this time, the other transmission device is preparing for being turned to the HS mode. Accordingly, in a case where the termination controller PHY-FSM is detecting that the other transmission device is turned to LP-00 of the LP mode (during detection of LP-00 of the LP mode), for example, the termination controller PHY-FSM outputs, to the terminator resistor RT, a control signal for turning the terminator resistor RT from off to on as a control signal RTON. Thus, the terminator resistor RT is turned from off to on.

The mode of the other transmission device is detected by determining the voltage of the pair of output terminals 40A and 40B by a predetermined threshold value, for example. Suppose that the other transmission device starts a transition to the HS mode, and thereafter is transitioned to the HS mode, ends the HS mode, and starts a transition from the HS mode to the LP mode. The voltage of the output terminals 40A and 40B at this time is detected by the predetermined threshold value, thereby generating LPdata_p and LPdata_n. The termination controller PHY-FSM uses the LPdata_p and the LPdata_n as input data, and outputs, to the terminator resistor RT, a control signal for turning on or off the terminator resistor RT. Thus, the terminator resistor RT is turned on or off.

FIG. 8 illustrates an example of waveforms of the communication system 1. As illustrated in FIG. 8, in the transmission devices 10 and 20, a transmission device that outputs HS-TxData, LP-TxData, and PulUp to the data signal line 52 (the pair of the positive signal line Dp and the negative signal line Dn) is indicated by "FRONT", and a transmission device in the Hi-Z mode is indicated by "REAR". The reception device 30 receives the high-speed transmission data HS-TxData alternately outputted from the transmission devices 10 and 20 via the data signal line 52 (the pair of the positive signal line Dp and the negative signal line Dn). Accordingly, as illustrated in (C) of FIG. 8, it looks as if the reception device 30 receives the high-speed transmission data HS-TxData and LP-TxData from a single transmission device.

Here, in a case where the transmission mode of a first transmission device (the transmission device 10) of the transmission devices 10 and 20 is the HS mode, a mode controller (the transmission mode controller 24) of a second transmission device (the transmission device 20) of the transmission devices 10 and 20 turns the transmission mode of the second transmission device (the transmission device 20) to a termination mode in which the output terminals 40A and 40B of the second transmission device (the transmission device 20) are terminated. In contrast, in a case where the transmission mode of the second transmission device (the transmission device 20) of the transmission devices 10 and 20 is the HS mode, a mode controller (the transmission mode controller 14) of the first transmission device (the transmission device 10) of the transmission devices 10 and 20 turns the transmission mode of the first transmission device (the transmission device 10) to a termination mode in which the output terminals 40A and 40B of the first transmission device (the transmission device 10) are terminated.

In addition, the termination controller PHY-FSM of the first transmission device (the transmission device 10) turns the terminator resistor RT from off to on in a case where desired successive transitions to LP-11, LP-01, and LP-00 (LP-11-LP-01-LP-00) are detected in the transmission mode of the other transmission device (the transmission device 20). In contrast, the termination controller PHY-FSM of the second transmission device (the transmission device 20) turns the terminator resistor RT from off to on in a case where desired successive transitions to LP-11, LP-01, and LP-00 are detected in the transmission mode of the other transmission device (the transmission device 10).

In addition, the termination controller PHY-FSM of the first transmission device (the transmission device 10) turns the terminator resistor RT from off to on in a case where the voltage of the pair of output terminals 40A and 40B is determined by a predetermined threshold value to detect a desired transition. In contrast, the termination controller PHY-FSM of the second transmission device (the transmission device 20) turns the terminator resistor RT from off to on in a case where the voltage of the pair of output terminals 40A and 40B is determined by the predetermined threshold value to detect a desired transition.

In addition, the termination controller PHY-FSM of the first transmission device (the transmission device 10) turns the terminator resistor RT from on to off in a case where the termination controller PHY-FSM of the first transmission device (the transmission device 10) detects that the transmission mode of the other transmission device (the transmission device 20) is LP-11 of the LP mode. In contrast, the termination controller PHY-FSM of the second transmission device (the transmission device 20) turns the terminator resistor RT from on to off in a case where the termination controller PHY-FSM of the second transmission device (the transmission device 20) detects that the transmission mode of the other transmission device (the transmission device 10) is LP-11 of the LP mode.

In addition, the termination controller PHY-FSM of the first transmission device (the transmission device 10) turns the terminator resistor RT from on to off in a case where the termination controller PHY-FSM of the first transmission device (the transmission device 10) detects that the voltage of the pair of output terminals 40A and 40B exceeds a predetermined threshold value. In contrast, the termination controller PHY-FSM of the second transmission device (the transmission device 20) turns the terminator resistor RT from on to off in a case where the termination controller PHY-FSM of the second transmission device (the transmission device 20) detects that the voltage of the pair of output terminals 40A and 40B exceeds the predetermined threshold value.

In addition, in the first transmission device (the transmission device 10), in a case where the transmission mode is displaced from the HS mode to the LP mode, the transmission mode controller 11 inserts the PullUp mode in which the voltage of the pair of output terminals 40A and 40B is pulled up. In contrast, in the second transmission device (the transmission device 20), in a case where the transmission mode is displaced from the HS mode to the LP mode, the transmission mode controller 21 inserts, after such displacement, the PullUp mode in which the voltage of the pair of output terminals 40A and 40B is pulled up.

In addition, in the first transmission device (the transmission device 10), the mode controller 11 inserts, before and after the termination mode, the HiZ mode in which the voltage of the pair of output terminals 40A and 40B is set to high impedance. In contrast, in the second transmission device (the transmission device 20), the mode controller 21 inserts, before and after the termination mode, the HiZ mode in which the voltage of the pair of output terminals 40A and 40B is set to high impedance.

[Effects]

Next, description is given of effects of the communication system 1 according to the present embodiment.

In recent years, drones, wearable devices, automobiles, and the like equipped with a plurality of cameras are rapidly increasing. High-speed interface specifications such as C-PHY specification and D-PHY specification that have been developed by the MIPI alliance are applied in a case where image data from a plurality of cameras is transmitted to an application processor and the like.

Incidentally, in the MIPI, data transmission is point-to-point transmission; therefore, there are many issues to be solved to support a plurality of cameras, such as limitations on the number of pins on an application processor side, an increase in size of a transmission path, and product design. Multipoint bus transmission shows promise for support of a plurality of cameras. However, in existing multipoint bus transmission, waveform quality is greatly deteriorated by an influence of reflection and the like, which causes an issue that the existing multipoint bus transmission is not suitable for high-speed transmission.

In contrast, in the present embodiment, in a case where the transmission mode of the first transmission device (the transmission device 10) of the transmission devices 10 and 20 is the HS mode, the transmission mode of the second transmission device (the transmission device 20) of the transmission devices 10 and 20 is the termination mode in which the output terminals 40A and 40B of the second transmission device (the transmission device 20) are terminated. This makes it possible to suppress total reflection in the second transmission device (the transmission device 20) in a case where the transmission mode of the first transmission device (the transmission device 10) is the HS mode. In addition, it is possible to perform transmission while performing switching between the HS mode and the LP mode. This consequently makes it possible to achieve multipoint bus transmission suitable for high-speed transmission.

In addition, in the present embodiment, each of the data transmitters 15 and 25 includes the terminator resistor RT that is configured to turn on and off termination of the pair of output terminals 40A and 40B coupled to the data signal line 52. Further, the transmission mode of any other transmission device is detected on the basis of the voltage of the pair of output terminals 40A and 40B, and on and off of the terminator resistor RT is controlled on the basis of a result of such detection. This makes it possible to suppress total reflection in the second transmission device (the transmission device 20) in a case where the transmission mode of the first transmission device (the transmission device 10) is the HS mode. In addition, it is possible to perform transmission while performing switching between the HS mode and the LP mode. This consequently makes it possible to achieve multipoint bus transmission suitable for high-speed transmission.

In addition, in the present embodiment, in the termination controller PHY-FSM of the first transmission device (the transmission device 10), the terminator resistor RT is turned from off to on in a case where desired successive transitions to LP-11, LP-01, and LP-00 are detected in the transmission mode of the other transmission device (the transmission device 20). Accordingly, total reflection in the second transmission device (the transmission device 20) is suppressed by the terminator resistor RT in a case where the transmission mode of the first transmission device (the transmission device 10) is the HS mode. This consequently makes it possible to achieve multipoint bus transmission suitable for high-speed transmission.

In addition, in the present embodiment, in the termination controller PHY-FSM of the first transmission device (the transmission device 10), the terminator resistor RT is turned from off to on in a case where the pair of output terminals 40A and 40B is determined by the predetermined threshold value to detect a desired transition. This makes it possible to suppress total reflection in the second transmission device (the transmission device 20) by the terminator resistor RT in a case where the transmission mode of the first transmission device (the transmission device 10) is the HS mode. This consequently makes it possible to achieve multipoint bus transmission suitable for high-speed transmission.

In addition, in the present embodiment, in the termination controller PHY-FSM of the first transmission device (the transmission device 10), the terminator resistor RT is turned from on to off in a case where the termination controller PHY-FSM of the first transmission device (the transmission device 10) detects that the transmission mode of the other transmission device (the transmission device 20) is LP-11 of the LP mode. This makes it possible to perform transmission while performing switching between the HS mode and the LP mode. This consequently makes it possible to achieve multipoint bus transmission suitable for high-speed transmission.

In addition, in the present embodiment, in the termination controller PHY-FSM of the first transmission device (the transmission device 10), the terminator resistor RT is turned from on to off in a case where the termination controller PHY-FSM of the first transmission device (the transmission device 10) detects that the voltage of the pair of output terminals 40A and 40B exceeds the predetermined threshold value. This makes it possible to perform transmission while performing switching between the HS mode and the LP mode. A This consequently makes it possible to achieve multipoint bus transmission suitable for high-speed transmission.

In addition, in the present embodiment, in the first transmission device (the transmission device 10), in a case where the transmission mode is displaced from the HS mode to the LP mode, the transmission mode controller 11 inserts the PulUp mode in which the voltage of the pair of output terminals 40A and 40B is pulled up. This makes it possible to reduce the possibility that an unintended unnecessary current flows by superimposing LP-11 sections of the LP mode on each other in a case where transmission is performed while performing switching between the transmission device 10 and the transmission device 20. This consequently makes it possible to perform transmission while performing switching between the HS mode and the LP mode. Accordingly, it is possible to achieve multipoint bus transmission suitable for high-speed transmission.

In addition, in the present embodiment, in the first transmission device (the transmission device 10), the mode controller 11 inserts, before and after the termination mode, the HiZ mode in which the voltage of the pair of output terminals 40A and 40B is set to high impedance. The first transmission device is turned to the HiZ mode in a case where the second transmission device performs HS mode transmission and LP mode transmission. In addition, the second transmission device is turned to the HiZ mode in a case where the first transmission device performs HS mode transmission and LP mode transmission. The first transmission device and the second transmission device exclusively use the HS mode • LP mode and the HiZ mode in such a manner, which makes it possible to achieve time-divisional use of a multipoint bus transmission path by the first transmission device and the second transmission device. Accordingly, it is possible to achieve multipoint bus transmission suitable for high-speed transmission.

In addition, in the present embodiment, the transmission mode (the HS mode, the LP mode, the pullup mode, or a high impedance mode) is decided on the basis of a combination of the three control signals HSEN, DRVEN, and PU_EN. This makes it possible to achieve multipoint bus transmission suitable for high-speed transmission by a simple control method.

2. Modification Examples

Modification Example A

FIG. 9 illustrates a modification example of the configuration of the communication system 1 according to the embodiment described above. The communication system 1 according to the embodiment described above may include three or more transmission devices. The communication system 1 according to the present modification example includes, for example, transmission devices 10, 20, and 40 and the reception device 30. The communication system 1 includes the clock lane CL the data lane DL over the transmission devices 10, 20, and 40 and the reception device 30. The clock lane CL transmits the clock signal, and the data lane DL transmits the data signal such as image data, for example. That is, the communication system 1 is configured to perform multipoint bus transmission.

The transmission device 40 includes a digital transmitter circuit and an analog transmitter circuit, as with the transmission devices 10 and 20. For example, a 16-bit or 8-bit parallel signal is transmitted between the digital transmitter circuit and the analog transmitter circuit. In addition, a 16-bit or 8-bit parallel signal is transmitted between the digital receiver circuit and the analog receiver circuit. In the clock lane CL, the analog transmitter circuit and the analog receiver circuit are coupled to each other by the clock signal line 51 that transmits a differential clock signal. In the data lane DL, the analog transmitter circuit and the analog receiver circuit are coupled to each other by the data signal line 52 that transmits a differential data signal. The clock signal line 51 includes a pair of the positive signal line Cp and the negative signal line Cn that transmit a differential signal. The data signal line 52 includes a pair of the positive signal line Dp and the negative signal line Dn that transmit a differential signal. For example, a 1-bit serial signal is transmitted to each of the clock signal line 51 and the data signal line 52.

The transmission device 40 includes the clock transmitter circuit 121 and the data transmitter circuit 122, for example, as with the transmission device 20. In the clock lane CL, the clock transmitter circuits 111 and 121 and the clock receiver circuit 131 are coupled to each other by the clock signal line 51 described above. In the data lane DL, the data transmitter circuits 112 and 122 and the data receiver circuit 132 are coupled to each other by the data signal line 52 described above. Each of the clock transmitter circuits 111 and 121 is a differential signal transmitter circuit that generates a differential clock signal as the clock signal and outputs the thus-generated differential clock signal to the clock signal line 51. Each of the data transmitter circuits 112 and 122 is a differential signal transmitter circuit that generates a differential data signal as the data signal and outputs the thus-generated differential data signal to the data signal line 52. The clock receiver circuit 131 is a differential signal receiver circuit that receives the differential clock signal as the clock signal via the clock signal line 51 and performs predetermined processing on the received differential clock signal. The data receiver circuit 132 is a differential signal receiver circuit that receives the differential data signal as the data signal via the data signal line 52 and performs predetermined processing on the received differential data signal. It should be noted that each of the clock transmission devices 111 and 121 and the data transmission devices 112 and 122 may be a ternary signal transmitter circuit that outputs a ternary level signal. In addition, each of the clock receiver circuit 131 and the data receiver circuit 132 may be a ternary signal receiver circuit.

The transmission device 40 includes, in the clock lane CL, a transmission mode controller 41, a clock generator 42, and a clock transmitter 43, for example, as illustrated in FIG. 10. The transmission device 40 includes, in the data lane DL, a transmission data generator 44 and a data transmitter 45, for example, as illustrated in FIG. 10. The transmission mode controller 41 decides a transmission mode in accordance with an instruction from an upper layer (e.g., three control signals HSEN, DRVEN, and PU_EN). The transmission mode controller 41 further performs control corresponding to a decided transmission mode, on the clock generator 42 and the transmission data generator 44. The clock generator 42 generates a clock signal with a clock frequency corresponding to a transmission mode in accordance with an instruction of the transmission mode controller 41. The clock generator 42 outputs the generated clock signal to the clock transmitter 43 and the transmission data generator 44. The clock transmitter 43 outputs the clock signal generated by the clock generator 42 to the clock signal line 51. That is, the clock transmitter 43 outputs the clock signal generated by the clock generator 22 to the clock receiver 31 via the clock signal line 51.

The transmission data generator 44 performs, in accordance with an instruction of the transmission mode controller 41, various kinds of processing such as communication protocol control, decoding of data inputted from an upper layer, insertion of a control command, and parallel-serial conversion, on an inputted data signal (e.g., high-speed transmission data HS-TxData or low-speed transmission data LP-TxData), thereby generating a data signal. The transmission data generator 44 outputs the generated data signal to the data transmitter 45. The transmission data generator 44 switches various kinds of processing described above in accordance with an instruction of the transmission mode controller 41. The data transmitter 45 outputs the data signal generated by the transmission data generator 44 to a data signal line. That is, the data transmitter 45 outputs the data signal generated by the transmission data generator 44 to the data receiver 32 via the data signal line. The data transmitter 45 has, for example, a configuration similar to that of the data transmitters 11 and 25, as illustrated in FIG. 5.

FIG. 11 illustrates an example of waveforms of the communication system 1 according to the present modification example. As illustrated in FIG. 11, the transmission devices 10, 20, and 40 sequentially output the high-speed transmission data HS-TxData and the low-speed transmission data LP-TxData to a data signal line 42 (the pair of the positive signal line Dp and the negative signal line Dn). It should be noted that in FIG. 11, a transmission device that outputs HS-TxData, LP-TxData, and PullUp is indicated by "FRONT", and a transmission device in the Hi-Z mode is indicated by "REAR". The reception device 30 receives the high-speed transmission data HS-TxData and the low-speed transition data LP-TxData alternately outputted from the transmission devices 10, 20, and 40 via the data signal line 42 (the pair of the positive signal line Dp and the negative signal line Dn). Accordingly, as illustrated in (C) of FIG. 11, it looks as if the reception device 30 receives HS-TxData and LP-TxData from a single transmission device.

Here, in a case where the transmission mode of a first transmission device (the transmission device 10) of the transmission devices 10, 20, and 40 is the HS mode, mode controllers (the transmission mode controllers 24 and 44) of a second transmission device (the transmission device 20) and a third transmission device (the transmission device 40) of the transmission devices 10, 20, and 40 turn the transmission modes of the second transmission device (the transmission device 20) and the third transmission device (the transmission device 40) to a termination mode in which the output terminals 40A and 40B of the second transmission device (the transmission device 20) and the third transmission device (the transmission device 40) are terminated. In addition, in a case where the transmission mode of the second transmission device (the transmission device 20) of the transmission devices 10, 20, and 40 is the HS mode, mode controllers (the transmission mode controllers 14) of the first transmission device (the transmission device 10) and the third transmission device (the transmission device 40) of the transmission devices 10, 20, and 40 turn the transmission modes of the first transmission device (the transmission device 10) and the third transmission device (the transmission device 40) to a termination mode in which the output terminals 40A and 40B of the first transmission device (the transmission device 10) and the third transmission device (the transmission device 40) are terminated. In addition, in a case where the transmission mode of the third transmission device (the transmission device 40) of the transmission devices 10, 20, and 40 is the HS mode, mode controllers (the transmission mode controllers 14) of the first transmission device (the transmission device 10) and the second transmission device 20 of the transmission devices 10, 20, and 40 turn the transmission modes of the first transmission device (the transmission device 10) and the second transmission device (the transmission device 20) to a termination mode in which the output terminals 40A and 40B of the first transmission device (the transmission device 10) and the second transmission device (the transmission device 20) are terminated.

In addition, the termination controller PHY-FSM of the first transmission device (the transmission device 10) turns the terminator resistor RT from off to on in a case where desired successive transitions to LP-11, LP-01, and LP-00 are detected in the transmission modes of the other transmission devices (the transmission devices 20 and 40). In addition, the termination controller PHY-FSM of the second transmission device (the transmission device 20) turns the terminator resistor RT from off to on in a case where desired successive transitions to LP-11, LP-01, and LP-00 are detected in the transmission modes of the other transmission devices (the transmission devices 10 and 40). In addition, the termination controller PHY-FSM of the third transmission device (the transmission device 40) turns the terminator resistor RT from off to on in a case where desired successive transitions to LP-11, LP-01, and LP-00 are detected in the transmission modes of the other transmission devices (the transmission devices 10 and 20).

In addition, the termination controller PHY-FSM of the first transmission device (the transmission device 10) turns the terminator resistor RT from off to on in a case where the voltage of the pair of output terminals 40A and 40B is determined by a predetermined threshold value to detect a desired transition. In addition, the termination controller PHY-FSM of the second transmission device (the transmission device 20) turns the terminator resistor RT from off to on in a case where the voltage of the pair of output terminals 40A and 40B is determined by the predetermined threshold value to detect a desired transition. In addition, the termination controller PHY-FSM of the third transmission device (the transmission device 40) turns the terminator resistor RT from off to on in a case where the voltage of the pair of output terminals 40A and 40B is determined by the predetermined threshold value to detect a desired transition.

In addition, the termination controller PHY-FSM of the first transmission device (the transmission device 10) turns the terminator resistor RT from on to off in a case where desired successive transitions to LP-11, LP-01, and LP-00 are detected in the transmission modes of the other transmission devices (the transmission devices 20 and 40). In addition, the termination controller PHY-FSM of the second transmission device (the transmission device 20) turns the terminator resistor RT from on to off in a case where desired successive transitions to LP-11, LP-01, and LP-00 are detected in the transmission modes of the other transmission devices (the transmission devices 10 and 40). In addition, the termination controller PHY-FSM of the third transmission device (the transmission device 40) turns the terminator resistor RT from on to off in a case where desired successive transitions to LP-11, LP-01, and LP-00 are detected in the transmission modes of the other transmission devices (the transmission devices 10 and 20).

In addition, the termination controller PHY-FSM of the first transmission device (the transmission device 10) turns the terminator resistor RT from on to off in a case where the voltage of the pair of output terminals 40A and 40B is determined by a predetermined threshold value to detect a desired transition. In addition, the termination controller PHY-FSM of the second transmission device (the transmission device 10) turns the terminator resistor RT from on to off in a case where the voltage of the pair of output terminals 40A and 40B is determined by the predetermined threshold value to detect a desired transition. In addition, the termination controller PHY-FSM of the third transmission device (the transmission device 40) turns the terminator resistor RT from on to off in a case where the voltage of the pair of output terminals 40A and 40B is determined by the predetermined threshold value to detect a desired transition.

In addition, in the first transmission device (the transmission device 10), in a case where the transmission mode is displaced from the HS mode to the LP mode, the transmission mode controller 11 inserts the PullUp mode in which the voltage of the pair of output terminals 40A and 40B is pulled up. In addition, in the second transmission device (the transmission device 20), in a case where the transmission mode is displaced from the HS mode to the LP mode, the transmission mode controller 21 inserts the PullUp mode in which the voltage of the pair of output terminals 40A and 40B is pulled up. In addition, in the third transmission device (the transmission device 40), in a case where the transmission mode is displaced from the HS mode to the LP mode, the transmission mode controller 41 inserts the PullUp mode in which the voltage of the pair of output terminals 40A and 40B is pulled up.

In addition, in the first transmission device (the transmission device 10), the mode controller 11 inserts, before and after the termination mode, the HiZ mode in which the voltage of the pair of output terminals 40A and 40B is set to high impedance. In addition, in the second transmission device (the transmission device 20), the mode controller 21 inserts, before and after the termination mode, the HiZ mode in which the voltage of the pair of output terminals 40A and 40B is set to high impedance. In addition, in the third transmission device (the transmission device 40), the mode controller 41 inserts, before and after the termination mode, the HiZ mode in which the voltage of the pair of output terminals 40A and 40B is set to high impedance.

[Effects]

Next, description is given of effects of the communication system 1 according to the present modification example.

In the present modification example, in a case where the transmission mode of the first transmission device (the transmission device 10) of the transmission devices 10, 20, and 40 is the HS mode, the transmission modes of the second transmission device (the transmission device 20) and the third transmission device (the transmission device 40) of the transmission devices 10, 20, and 20 are the termination mode in which the output terminals 40A and 40B of the second transmission device (the transmission device 20) and the third transmission device (the transmission device 40) are terminated. This makes it possible to suppress total reflection in the second transmission device (the transmission device 20) and the third transmission device (the transmission device 40) in a case where the transmission mode of the first transmission device (the transmission device 10) is the HS mode. In addition, it is possible to perform transmission while performing switching between the HS mode and the LP mode. This consequently makes it possible to achieve multipoint bus transmission suitable for high-speed transmission.

In addition, in the present modification example, each of the data transmitters 15, 25, and 45 includes the terminator resistor RT that is configured to turn on and off termination of the pair of output terminals 40A and 40B coupled to the data signal line 42. Further, the transmission modes of the other transmission devices are detected on the basis of the voltage of the pair of output terminals 40A and 40B, and on and off of the terminator resistor RT is controlled on the basis of a result of such detection. This makes it possible to suppress total reflection in the second transmission device (the transmission device 20) and the third transmission device (the transmission device 40) in a case where the transmission mode of the first transmission device (the transmission device 10) is the HS mode. In addition, it is possible to perform transmission while performing switching between the HS mode and the LP mode. This consequently makes it possible to achieve multipoint bus transmission suitable for high-speed transmission.

In addition, in the present modification example, in the termination controller PHY-FSM of the first transmission device (the transmission device 10), the terminator resistor RT is turned from off to on in a case where desired successive transitions to LP-11, LP-01, and LP-00 are detected in the transmission modes of the other transmission devices (the transmission devices 20 and 40). Accordingly, total reflection in the second transmission device (the transmission device 20) and the third transmission device (the transmission device 40) is suppressed by the terminator resistor RT in a case where the transmission mode of the first transmission device (the transmission device 10) is the HS mode. This consequently makes it possible to achieve multipoint bus transmission suitable for high-speed transmission.

In addition, in the present modification example, in the termination controller PHY-FSM of the first transmission device (the transmission device 10), the terminator resistor RT is turned from off to on in a case where the pair of output terminals 40A and 40B is determined by the predetermined threshold value to detect a desired transition. This makes it possible to suppress total reflection in the second transmission device (the transmission device 20) and the third transmission device (the transmission device 40) by the terminator resistor RT in a case where the transmission mode of the first transmission device (the transmission device 10) is the HS mode. This consequently makes it possible to achieve multipoint bus transmission suitable for high-speed transmission.

In addition, in the present modification example, in the termination controller PHY-FSM of the first transmission device (the transmission device 10), the terminator resistor RT is turned from on to off in a case where the termination controller PHY-FSM of the first transmission device (the transmission device 10) detects that the transmission modes of the other transmission devices (the transmission devices 20 and 40) are LP-11 of the LP mode. This makes it possible to perform transmission while performing switching between the HS mode and the LP mode. This consequently makes it possible to achieve multipoint bus transmission suitable for high-speed transmission.

In addition, in the present modification example, in the termination controller PHY-FSM of the first transmission device (the transmission device 10), the terminator resistor RT is turned from on to off in a case where the termination controller PHY-FSM of the first transmission device (the transmission device 10) detects that the voltage of the pair of output terminals 40A and 40B exceeds the predetermined threshold value. This makes it possible to perform transmission while performing switching between the HS mode and the LP mode. This consequently makes it possible to achieve multipoint bus transmission suitable for high-speed transmission.

In addition, in the present modification example, in the first transmission device (the transmission device 10), in a case where the transmission mode is displaced from the HS mode to the LP mode, the transmission mode controller 11 inserts the PullUp mode in which the voltage of the pair of output terminals 40A and 40B is pulled up. This makes it possible to reduce the possibility that an unintended unnecessary current flows by superimposing LP-11 sections of the LP mode on each other in a case where transmission is performed while sequentially performing switching among the transmission device 10, the transmission device 20, and the transmission device 40. This consequently makes it possible to perform transmission while performing switching between the HS mode and the LP mode. Accordingly, it is possible to achieve multipoint bus transmission suitable for high-speed transmission.

In addition, in the present modification example, in the first transmission device (the transmission device 10), the mode controller 11 inserts, before and after the termination mode, the HiZ mode in which the voltage of the pair of output terminals 40A and 40B is set to high impedance. The first transmission device is turned to the HiZ mode in a case where the second transmission device or the third transmission device performs HS mode transmission and LP mode transmission. In addition, the second transmission device is turned to the HiZ mode in a case where the first transmission device or the third transmission device performs HS mode transmission and LP mode transmission. The third transmission device is turned to the HiZ mode in a case where the first transmission device or the second transmission device performs HS mode transmission and LP mode transmission. The first transmission device, the second transmission device, and the third transmission device exclusively use the HS mode • LP mode and the HiZ mode in such a manner, which makes it possible to achieve time-divisional use of a multipoint bus transmission path by the first transmission device, the second transmission device, and the third transmission device. Accordingly, it is possible to achieve multipoint bus transmission suitable for high-speed transmission.

In addition, in the present modification example, the transmission mode (the HS mode, the LP mode, the pullup mode, or the high impedance mode) is decided on the basis of a combination of the three control signals HSEN, DRVEN, and PU_EN. This makes it possible to achieve multipoint bus transmission suitable for high-speed transmission by a simple control method.

Modification Example B

FIG. 12 illustrates a modification example of waveforms of the communication system 1 according to the modification example A described above. In the present modification example, the transmission device 40 does not output the high-speed transmission data HS-TxData and the low-speed transmission data LP-TxData, and the transmission device 40 is in a mode (specifically the high impedance mode) other than the HS mode and the LP mode, for example, as illustrated in (C) of FIG. 12. Accordingly, in the present modification example, the reception device 30 receives the high-speed transmission data HS-TxData and the low-speed transmission data LP-TxData alternately outputted from the transmission devices 10 and 20 via the data signal line 52 (the pair of the positive signal line Dp and the negative signal line Dn), for example, as illustrated in (D) of FIG. 12. Even in a case where some transmission devices of a plurality of transmission devices are in a mode (specifically, the high impedance mode) other than the HS mode and the LP mode in such a manner, effects similar to those in the embodiment descried above are achieved.

Modification Example C

FIG. 13 illustrates an example of a circuit configuration of the communication system 1 according to the embodiment described above. The communication system 1 according to the embodiment described above may include, for example, a transmission device TX1 serving as the transmission device 10, a transmission device TX2 serving as the transmission device 20, and a reception device RX serving as the reception device 30, as illustrated in FIG. 13. The communication system 1 according to the embodiment described above may further include a transmission path P that couples the respective transmission devices TX1 and TX2 and the reception device RX to each other, for example, as illustrated in FIG. 13.

The transmission path P is branched at a midpoint into three, and has branch points $H_p$ and $H_n$. A transmission path $P_1$ that is one of branches couples the transmission device TX1 and the branch points $H_p$ and $H_n$ to each other. The transmission path $P_1$ includes a pair of signal lines $P_{1p}$ and $P_{1n}$ that transmit a differential signal. The signal line $P_{1p}$ is coupled to the branch point $H_p$, and the signal line $P_{1n}$ is coupled to the branch point $H_n$. A terminator resistor $R_T/2$ of the transmission device TX1 is provided for each of the signal lines $P_{1p}$ and $P_{1n}$.

A transmission path $P_2$ that is one of the branches couples the transmission device TX2 and the branch points $H_p$ and $H_n$ to each other. The transmission path $P_2$ includes a pair of signal lines $P_{2p}$ and $P_{2n}$ that transmit a differential signal. The signal line $P_{2p}$ is coupled to the branch point $H_p$, and the signal line $P_{2n}$ is coupled to the branch point $H_n$. The terminator resistor $R_T/2$ of the transmission device TX2 is provided for each of the signal lines $P_{2p}$ and $P_{2n}$.

A transmission path $P_3$ that is one of the branches couples the reception device RX and the branch points $H_p$ and $H_n$ to each other. The transmission path $P_3$ includes a pair of signal lines $P_{3p}$ and $P_{3n}$ that transmit a differential signal. The signal line $P_{3p}$ is coupled to the branch point $H_p$, and the signal line $P_{3n}$ is coupled to the branch point $H_n$. The terminator resistor $R_T/2$ of the reception device RX is provided for each of the signal lines $P_{3p}$ and $P_{3n}$.

Each of the signal lines $P_{1p}$, $P_{2p}$, and $P_{3p}$ includes a resistor element R in proximity to the branch point $H_p$. Further, each of the signal lines $P_{1n}$, $P_{2n}$, and $P_{3n}$ also includes the resistor element R in proximity to the branch point $H_n$. Here, the resistor element R has a resistance value represented by the following expression (1), where a characteristic impedance of each of the signal lines $P_{1p}$, $P_{1n}$, $P_{2p}$, $P_{2n}$, $P_{3p}$, and $P_{3n}$ is $Z_0$, each of the terminator resistors for the respective signal lines $P_{1p}$, $P_{1n}$, $P_{2p}$, and $P_{2n}$ of the respective transmission devices TX and TX2 is $R_T/2$, and each of the terminator resistors for the respective signal lines $P_{3p}$ and $P_{3n}$ of the reception device RX is $R_T/2$.

$$R=((\text{number of branches}-1)\times Z_0-R_T/2)/\text{number of branches} \qquad (1)$$

In a case where the characteristic impedance $Z_0$ is 50 ohms and the terminator resistor $R_T/2$ has 100/2=50 ohms, the resistor element R has 16.7 ohms. At this time, each of the signal lines $P_{1p}$, $P_{1n}$, $P_{2p}$, $P_{2n}$, $P_{3p}$, and $P_{3n}$ has 50 ohms (Rs) as viewed from any port of the transmission devices TX1 and TX2 and the reception device RX, and is a transmission path achieving impedance matching.

To suppress deterioration in transmission characteristics by reflection, the respective resistor elements R are disposed as close to the branch points $H_p$ and $H_n$ as possible. In addition, to suppress deterioration in skew characteristics in a lane of the transmission path P, the signal lines $P_{1p}$ and $P_{1n}$ are disposed to lay wiring patterns of the signal line $P_{1p}$ and the signal line $P_{1n}$ in as approximate a layout as possible. Similarly, the signal lines $P_{2p}$ and $P_{2n}$ are disposed to lay wiring patterns of the signal line $P_{2p}$ and the signal line $P_{2n}$ in as approximate a layout as possible. Similarly, the signal lines $P_{3p}$ and $P_{3n}$ are disposed to lay wiring patterns of the signal line $P_{3p}$ and the signal line $P_{3n}$ in as approximate a layout as possible. In addition, to suppress deterioration in skew characteristic between lanes of the transmission path P, the respective signal lines $P_{1p}$, $P_{1n}$, $P_{2p}$, $P_{2n}$, $P_{3p}$, and $P_{3n}$ are disposed to lay wiring patterns of different lanes in as approximate a layout as possible.

In the communication system 1, in a case where the transmission device TX1 outputs a signal, for example, as illustrated in FIG. 13, output of the transmission device TX2 is stopped, and further, the transmission device TX2 is differentially terminated. Similarly, in the communication system 1, in a case where the transmission device TX2 outputs a signal, output of the transmission device TX1 is stopped, and further, the transmission device TX1 is differentially terminated.

FIG. 14 illustrates an example of pass characteristics in the communication system 1. FIG. 15 illustrates an example of reflection characteristics in the communication system 1. FIG. 16 illustrates an example of an eye diagram in the communication system 1. In FIG. 14, a lower waveform of two waveforms is a result of pass characteristics as viewed from the transmission devices TX1 and TX2, and an upper waveform of the two waveforms is a result of pass characteristics as viewed from the reception device RX. In FIG. 15, a result of reflection characteristics as viewed from the transmission devices TX1 and TX2 and a result of reflection characteristics as viewed from the reception device RX are superimposed on each other.

In FIG. 14, a signal level around 1 GHz is −5 dB. This means that the signal level is decreased to about a half by insertion of the resistor element R. In addition, in FIG. 15, a signal level around 1 GHz is −15 dB. In FIG. 16, an eye of the eye diagram is clearly open.

In the present modification example, the three-branched branch points $H_p$ and $H_1$ are provided in the transmission path P, and the resistor element R is provided for each of signal lines at the three-branched branch points $H_p$ and $H_n$. Thus, in the present modification example, only providing branches to the transmission path P by an extremely simple configuration makes it possible to achieve multipoint bus transmission suitable for high-speed transmission.

In addition, in the present modification example, each of the resistor elements R provided in the transmission path P has a resistance value represented by the expression (1) described above. Accordingly, each of the signal lines $P_{1p}$, $P_{1n}$, $P_{2p}$, $P_{2n}$, $P_{3p}$, and $P_{3n}$ has 50 ohms (Rs) as viewed from any port of the transmission devices TX1 and TX2 and the reception device RX, and is a transmission path achieving impedance matching. This makes it possible to achieve multipoint bus transmission suitable for high-speed transmission.

In addition, in the present modification example, a transmission device (e.g., the transmission device TX2) that does not output a signal is differentially terminated. This makes it possible to reduce noise in the transmission path P, as compared with a case where the transmission device that does not output a signal becomes a released end. This makes it possible to achieve multipoint bus transmission suitable for high-speed transmission.

Modification Example D

FIG. 17 illustrates a modification example of a circuit of each of the transmission data generators 15, 25, and 45 according to the embodiment and the modification examples A, B, and C described above. In the present modification example, the driver LP-TX, the driver LP-RX, and the pull-up resistor PU are not included in each of the transmission data generators 15, 25, and 45. In the present modification example, each of the transmission data generators 15, 25, and 45 includes a driver HS-TX, the terminator resistor RT, a pull-up/pull-down resistor PU/PD, and comparators CMP1 and CMP2.

The pull-up/pull-down resistor PU/PD includes a pull-down resistor and a pull-up resistor. The pull-down resistor is coupled to the positive signal line Dp and allows for pulling down, and the pull-up resistor is coupled to the negative signal line Dn and allows for pulling up. The pull-up/pull-down resistor PU/PD controls on and off of the pull-down resistor and the pull-up resistor on the basis of a control signal PUPDON for controlling pulling up and pulling down. The comparator CMP1 outputs a result of comparison between a voltage of the positive signal line Dp and a threshold value Vth to the termination controller PHY-FSM. The comparator CMP2 outputs a result of comparison between a voltage of the negative signal line Dn and the threshold value Vth to the termination controller PHY-FSM. The comparators CMP1 and CMP2 input, as 2-bit signals, two outputs of the LP-RX determined by the single threshold value Vth to the PHY-FSM of a subsequent stage.

FIG. 18 illustrates an example of waveforms of the communication system 1 including the transmission data generators 15 and 25 in FIG. 17. In the present modification example, the transmission devices 10 and 20 alternately output the high-speed transmission data HS-TxData to the data signal line 52 (the pair of the positive signal line Dp and the negative signal line Dn), as illustrated in FIG. 18. It should be noted that FIG. 18 illustrates, as an example, a case where the transmission data generators 15 and 25 output DIF-P and DIF-N before and after outputting the high-speed transmission data HS-TxData.

Here, in a case where the transmission mode of the first transmission device (the transmission device 10) of the transmission devices 10 and 20 is the HS mode, the mode controller (the transmission mode controller 24) of the second transmission device (the transmission device 20) of the transmission devices 10 and 20 turns the transmission mode of the second transmission device (the transmission device 20) to the termination mode in which the output terminals 40A and 40B of the second transmission device (the transmission device 20) are terminated. In contrast, in a case where the transmission mode of the second transmission device (the transmission device 20) of the transmission devices 10 and 20 is the HS mode, the mode controller (the transmission mode controller 14) of the first transmission device (the transmission device 10) of the transmission devices 10 and 20 turns the transmission mode of the first transmission device (the transmission device 10) to the termination mode in which the output terminals 40A and 40B of the first transmission device (the transmission device 10) are terminated.

In addition, the termination controller PHY-FSM of the first transmission device (the transmission device 10) turns the terminator resistor RT from off to on in a case where the transmission mode of the other transmission device (the transmission device 20) is transitioned from a DIF-N mode to a DIF-P mode. In contrast, the termination controller PHY-FSM of the second transmission device (the transmission device 20) turns the terminator resistor RT from off to on in a case where the transmission mode of the other transmission device (the transmission device 10) is transitioned from the DIF-N mode to the DIF-P mode.

In addition, the termination controller PHY-FSM of the first transmission device (the transmission device 10) turns the terminator resistor RT from on to off in a case where the termination controller PHY-FSM of the first transmission device (the transmission device 10) detects that the transmission mode of the other transmission device (the transmission device 20) is transitioned to the DIF-N mode and an amplitude in DIF-N is equal to or smaller than a predetermined threshold value. In contrast, the termination controller PHY-FSM of the second transmission device (the transmission device 20) turns the terminator resistor RT from on to off in a case where the termination controller PHY-FSM of the second transmission device (the transmission device 20) detects that the transmission mode of the other transmission device (the transmission device 10) is transitioned to the DIF-N mode and an amplitude in DIF-N is equal to or smaller than the predetermined threshold value.

In addition, in the first transmission device (the transmission device 10), in a case where the transmission mode is displaced from the DIF-N mode to the HiZ mode, to maintain a voltage level in the DIF-N mode, the transmission mode controller 11 inserts the PullUp mode in which the voltage of the pair of output terminals 40A and 40B is pulled up. In contrast, in the second transmission device (the transmission device 20), in a case where the transmission mode is displaced from the DIF-N mode to the HiZ mode, to maintain a voltage level in the DIF-N mode, the transmission mode controller 11 inserts the PullUp mode in which the voltage of the pair of output terminals 40A and 40B is pulled up.

In the present modification example, in a case where the transmission mode of the first transmission device (the transmission device 10) of the transmission devices 10 and 20 is the HS mode, the transmission mode of the second transmission device (the transmission device 20) of the transmission devices 10 and 20 is the termination mode in which the output terminals 40A and 40B of the second transmission device (the transmission device 20) are terminated. Accordingly, total reflection in the second transmission device (the transmission device 20) is suppressed in a case where the transmission mode of the first transmission device (the transmission device 10) is the HS mode. In addition, it is possible to perform transmission while performing switching between the HS mode and the DIF-N mode. This consequently makes it possible to achieve multipoint bus transmission suitable for high-speed transmission.

3. Application Examples

In the following, description is given of application examples of the communication system 1 according to any of the embodiment and the modification examples A to D thereof described above.

Application Example 1

FIG. 19 illustrates an appearance of a smartphone 2 (a multifunctional mobile phone) to which the communication system 1 according to any of the embodiment and the modification examples A to D thereof described above is applied. Various devices are mounted in the smartphone 2. The communication system according to any of the respective embodiments described above is applied to a communication system in which data are exchanged among these devices.

FIG. 20 illustrates a configuration example of an application processor 310 to be used in the smartphone 2. The application processor 310 includes a CPU (Central Processing Unit) 311, a memory controller 312, a power source controller 313, an external interface 314, a GPU (Graphics Processing Unit) 315, a media processor 316, a display controller 317, and an MIPI interface 318. In this example, the CPU 311, the memory controller 312, the power source controller 313, the external interface 314, the GPU 315, the media processor 316, and the display controller 317 are each coupled to a system bus 319 to allow for data exchange with one another via the system bus 319.

The CPU 311 processes various pieces of information handled in the smartphone 2 in accordance with a program. The memory controller 312 controls a memory 501 to be used in a case where the CPU 311 performs information processing. The power source controller 313 controls a power source of the smartphone 2.

The external interface 314 is an interface for communication with external devices. In this example, the external interface 314 is coupled to a wireless communication section 502 and to an image sensor 410. The wireless communication section 502 performs wireless communication with mobile phone base stations. The wireless communication section 502 includes, for example, a baseband section, an RF (radio frequency) front end section, and the like. The image sensor 410 acquires an image, and includes, for example, a CMOS sensor. For example, the communication system according to any of the embodiment and the modification examples A to D described above is applied to a communication system between the external interface 314 and the image sensor 410.

The GPU 315 performs image processing. The media processor 316 processes information such as voice, characters, and graphics. The display controller 317 controls a display 504 via the MIPI interface 318.

The MIPI interface 318 transmits an image signal to the display 504. As the image signal, for example, a signal such as a YUV-format signal and an RGB-format signal is usable. For example, the communication system according to the embodiment and the modification examples A to D described above is applied to a communication system between the MIPI interface 318 and the display 504.

FIG. 21 illustrates a configuration example of the image sensor 410. The image sensor 410 includes a sensor section 411, an ISP (Image Signal Processor) 412, a JPEG (Joint Photographic Experts Group) encoder 413, a CPU 414, a RAM (Random Access Memorr) 415, a ROM (Read Only Memory) 416, a power source controller 417, an I$^2$C (Inter-Integrated Circuit) interface 418, and an MIPI interface 419. In this example, these respective blocks are coupled to a system bus 420 to allow for data exchange with one another via the system bus 420.

The sensor section 411 acquires an image, and includes, for example, a CMOS sensor. The ISP 412 performs predetermined processing on the image acquired by the sensor section 411. The JPEG encoder 413 encodes the image processed by the ISP 412 to generate a JPEG-format image. The CPU 414 controls respective blocks of the image sensor 410 in accordance with a program. The RAM 415 is a memory to be used in a case where the CPU 414 performs information processing. The ROM 416 stores a program to be executed in the CPU 414. The power source controller 417 controls a power source of the image sensor 410. The I$^2$C interface 418 receives a control signal from the application processor 310. In addition, although not illustrated, the image sensor 410 also receives a clock signal from the application processor 310, in addition to the control signal. Specifically, the image sensor 410 is configured to be operable on the basis of clock signals with various frequencies.

The MIPI interface 419 transmits an image signal to the application processor 310. As the image signal, for example, a signal such as a YUV-format signal and an RGB-format signal is usable. For example, the communication system according to any of the respective embodiments described above is applied to a communication system between the MIPI interface 419 and the application processor 310.

Application Example 3

FIG. 22 and FIG. 23 each illustrate a configuration example of a vehicle-mounted camera as an application example to an imaging device. FIG. 22 illustrates an installation example of the vehicle-mounted camera, and FIG. 23 illustrates an internal configuration example of the vehicle-mounted camera.

For example, vehicle-mounted cameras 401, 402, 403, and 404 are respectively mounted on the front (front), left, right, and rear (rear) of a vehicle 301, as illustrated in FIG. 22. The vehicle-mounted cameras 401 to 404 are each coupled to an ECU (Electrical Control Unit) 302 via an in-vehicle network.

An image capturing angle of the vehicle-mounted camera 401 mounted on the front of the vehicle 301 is within a range indicated by "a" in FIG. 22, for example. An image capturing angle of the vehicle-mounted camera 402 is within a range indicated by "b" in FIG. 22, for example. An image capturing angle of the vehicle-mounted camera 403 is within a range indicated by "c" in FIG. 22, for example. An image capturing angle of the vehicle-mounted camera 404 is within a range indicated by "d" in FIG. 22, for example. Each of the vehicle-mounted cameras 401 to 404 outputs a captured image to the ECU 302. This consequently makes it possible to capture a 360-degree (omnidirectional) image on the front, right, left, and rear of the vehicle 301 in the ECU 302.

For example, each of the vehicle-mounted cameras 401 to 404 includes an image sensor 431, a DSP (Digital Signal Processing) circuit 432, a selector 433, and a SerDes (SERializer/DESerializer) circuit 434, as illustrated in FIG. 23.

The DSP circuit 432 performs various kinds of image signal processing on an imaging signal outputted from the image sensor 431. The SerDes circuit 434 performs serial-parallel conversion of a signal, and includes, for example, a vehicle-mounted interface chip such as FPD-Link III.

The selector 433 selects whether to output the imaging signal outputted from the image sensor 431 via the DSP circuit 432 or not via the DSP circuit 432.

The communication system according to any of the respective embodiments described above is applicable to, for example, a coupling interface 441 between the image sensor 431 and the DSP circuit 432. Moreover, the communication system according to any of the respective embodiments described above is applicable to, for example, a coupling interface 442 between the image sensor 431 and the selector 433.

Although the present disclosure has been described above referring to a plurality of embodiments and the modification examples thereof, the present disclosure is not limited to the embodiments and the like described above, and may be modified in a variety of ways. It should be noted that effects described herein are merely illustrative. The effects of the present disclosure are not limited to those described in the specification. The present disclosure may have effects other than those described in the specification.

In addition, for example, the present disclosure may have the following configurations.

(1)

A communication system that transmits data from a plurality of transmission devices to one reception device via a pair of signal lines, each of the transmission devices including:

a mode controller that controls a transmission mode;

a transmission data generator that generates the data in accordance with the transmission mode controlled by the mode controller; and a data transmitter that transmits the data generated by the transmission data generator to the reception device, in a case where the transmission mode of a first transmission device of the plurality of the transmission devices is an HS (High Speed) mode, the mode controller of a second transmission device of the plurality of the transmission devices turning the transmission mode of the second transmission device to a termination mode in which an output terminal of the second transmission device is terminated.

(2)

The communication system according to (1), in which each of the data transmitters includes a terminator resistor that is configured to turn on and off termination of a pair of output terminals coupled to the pair of signal lines, and a termination controller that detects the transmission mode of other transmission devices on the basis of a voltage of the pair of output terminals and controls on and off of the terminator resistor on the basis of a result of such detection.

(3)

The communication system according to (2) in which the termination controller turns the terminator resistor from off to on in a case where desired successive transitions to LP-11, LP-01, and LP-00 are detected in the transmission modes of the other transmission devices.

(4)

The communication system according to (2) or (3), in which the termination controller turns the terminator resistor from off to on in a case where the voltage of the pair of output terminals is determined by a predetermined threshold value to detect a desired transition.

(5)

The communication system according to any one of (2) to (4), in which the termination controller turns the terminator resistor from on to off in a case where the termination controller detects that the transmission modes of the other transmission devices are LP-11 of a LP (Low Power) mode.

(6)

The communication system according to any one of (2) to (5), in which the termination controller turns the terminator resistor from on to off in a case where the termination controller detects that the voltage of the pair of output terminals exceeds a predetermined threshold value.

(7)

The communication system according to any one of (2) to (6), in which in the first transmission device, in a case where the transmission mode is displaced from the HS mode to an LP mode, the transmission mode controller inserts a pull-up mode in which the voltage of the pair of output terminals is pulled up.

(8)

The communication system according to (7), in which in the second transmission device, the mode controller inserts, before and after the termination mode, a high impedance mode in which the voltage of the pair of output terminals is set to high impedance.

(9)

The communication system according to (8), in which the mode controller controls the HS mode, the LP mode, the pull-up mode, and the high impedance mode on the basis of a combination of three control signals.

(10)

A communication method of transmitting data from a plurality of transmission devices to one reception device via a pair of signal lines, the communication method including:

in a case where a transmission mode of a first transmission device of the plurality of the transmission devices is an HS (High Speed) mode, turning a transmission mode of a second transmission device of the plurality of transmission devices to a termination mode in which an output terminal of the second transmission device is terminated.

According to the communication system and the communication method according to the embodiments of the present disclosure, in a case where the transmission mode of the first transmission device of the plurality of transmission devices is the HS mode, the transmission mode of the second transmission device of the plurality of transmission devices is turned to the termination mode in which the output terminal of the second transmission device is terminated, which makes it possible to achieve multipoint bus transmission suitable for high-speed transmission. It should be noted that the effects of the present disclosure are not necessarily limited to the effects described here, and may be any of the effects described in the specification.

This application claims the benefit of Japanese Priority Patent Application JP2018-008943 filed with the Japan Patent Office on Jan. 23, 2018, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A communication system that transmits data from a plurality of transmission devices to one reception device via a pair of signal lines, each of the transmission devices comprising:
    a mode controller that controls a transmission mode;
    a transmission data generator that generates the data in accordance with the transmission mode controlled by the mode controller; and
    a data transmitter that transmits the data generated by the transmission data generator to the reception device,
    in a case where the transmission mode of a first transmission device of the plurality of the transmission devices is an HS (High Speed) mode, the mode controller of a second transmission device of the plurality of the transmission devices turning the transmission mode of the second transmission device to a termination mode in which an output terminal of the second transmission device is terminated,
    wherein
    each of the data transmitters includes
    a terminator resistor that is configured to turn on and off termination of a pair of output terminals coupled to the pair of signal lines, and
    a termination controller that detects the transmission mode of other transmission devices on a basis of a voltage of the pair of output terminals and controls on and off of the terminator resistor on a basis of a result of such detection.

2. The communication system according to claim 1, wherein
    the termination controller turns the terminator resistor from off to on in a case where desired successive transitions to LP-11, LP-01, and LP-00 are detected in the transmission modes of the other transmission devices.

3. The communication system according to claim 1, wherein
    the termination controller turns the terminator resistor from off to on in a case where the voltage of the pair of output terminals is determined by a predetermined threshold value to detect a desired transition.

4. The communication system according to claim 1, wherein
    the termination controller turns the terminator resistor from on to off in a case where the termination controller detects that the transmission modes of the other transmission devices are LP-11 of a LP (Low Power) mode.

5. The communication system according to claim 1, wherein
    the termination controller turns the terminator resistor from on to off in a case where the termination controller detects that the voltage of the pair of output terminals exceeds a predetermined threshold value.

6. The communication system according to claim 1, wherein
    in the first transmission device, in a case where the transmission mode is displaced from the HS mode to an LP mode, the transmission mode controller inserts a pull-up mode in which the voltage of the pair of output terminals is pulled up.

7. The communication system according to claim 6, wherein
    in the second transmission device, the mode controller inserts, before and after the termination mode, a high impedance mode in which the voltage of the pair of output terminals is set to high impedance.

8. The communication system according to claim 7, wherein
    the mode controller controls the HS mode, the LP mode, the pull-up mode, and the high impedance mode on a basis of a combination of three control signals.

9. A communication method of transmitting data from a plurality of transmission devices to one reception device via a pair of signal lines, each of the transmission devices including a mode controller that controls a transmission mode, a transmission data generator that generates the data in accordance with the transmission mode controlled by the mode controller and a data transmitter that transmits the data generated by the transmission data generator to the reception device, the communication method comprising:
    in a case where a transmission mode of a first transmission device of the plurality of the transmission devices is an HS (High Speed) mode, turning a transmission mode of a second transmission device of the plurality of transmission devices to a termination mode in which an output terminal of the second transmission device is terminated, wherein each of the data transmitters includes a terminator resistor that is configured to turn on and off termination of a pair of output terminals coupled to the pair of signal lines and a termination controller; and
    detecting, by the termination controller, the transmission mode of other transmission devices on a basis of a voltage of the pair of output terminals and controlling on and off of the terminator resistor on a basis of a result of such detection.

10. The communication method according to claim 9, further comprising:
    turning the terminator resistor from off to on in a case where desired successive transitions to LP-11, LP-01, and LP-00 are detected in the transmission modes of the other transmission devices.

11. The communication method according to claim 9, further comprising:
    turning the terminator resistor from off to on in a case where the voltage of the pair of output terminals is determined by a predetermined threshold value to detect a desired transition.

12. The communication method according to claim 9, further comprising:

turning the terminator resistor from on to off in a case where the termination controller detects that the transmission modes of the other transmission devices are LP-11 of a LP (Low Power) mode.

13. The communication method according to claim 9, further comprising:
    turning the terminator resistor from on to off in a case where the termination controller detects that the voltage of the pair of output terminals exceeds a predetermined threshold value.

14. The communication method according to claim 9, further comprising:
    in the first transmission device, in a case where the transmission mode is displaced from the HS mode to an LP mode, inserting, by the transmission mode controller, a pull-up mode in which the voltage of the pair of output terminals is pulled up.

15. The communication method according to claim 14, further comprising:
    in the second transmission device, inserting, before and after the termination mode, a high impedance mode in which the voltage of the pair of output terminals is set to high impedance.

16. The communication method according to claim 15, further comprising:
    controlling, by the mode controller, the HS mode, the LP mode, the pull-up mode, and the high impedance mode on a basis of a combination of three control signals.

* * * * *